US009426376B2

(12) United States Patent
Ueki et al.

(10) Patent No.: US 9,426,376 B2
(45) Date of Patent: Aug. 23, 2016

(54) IMAGE PICKUP ELEMENT, IMAGING DEVICE, AND IMAGING METHOD

(71) Applicant: SONY CORPORATION, Tokyo (JP)

(72) Inventors: Nobuo Ueki, Tokyo (JP); Masuyoshi Kurokawa, Kanagawa (JP); Yoichi Yagasaki, Tokyo (JP); Makoto Aoki, Tochigi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/441,291

(22) PCT Filed: Nov. 13, 2013

(86) PCT No.: PCT/JP2013/006671
§ 371 (c)(1),
(2) Date: May 7, 2015

(87) PCT Pub. No.: WO2014/080597
PCT Pub. Date: May 30, 2014

(65) Prior Publication Data
US 2015/0281539 A1 Oct. 1, 2015

(30) Foreign Application Priority Data

Nov. 20, 2012 (JP) .................................. 2012-254407

(51) Int. Cl.
*H04N 5/335* (2011.01)
*H04N 5/235* (2006.01)
(Continued)

(52) U.S. Cl.
CPC ............ *H04N 5/2351* (2013.01); *H04N 3/155* (2013.01); *H04N 5/232* (2013.01);
(Continued)

(58) Field of Classification Search
USPC ......................................................... 348/294
See application file for complete search history.

(56) References Cited

U.S. PATENT DOCUMENTS

| 5,612,788 A * | 3/1997 | Stone ................... H04N 19/115 |
| | | 375/E7.14 |
| 5,677,689 A * | 10/1997 | Yovanof ................. H04N 1/176 |
| | | 341/50 |
| 2003/0179939 A1* | 9/2003 | Kim ..................... G06F 15/7842 |
| | | 382/232 |

FOREIGN PATENT DOCUMENTS

| JP | 03-262391 | 11/1991 |
| JP | 96/31974 | 10/1996 |

(Continued)

OTHER PUBLICATIONS

Shoji Kawahito, et al., A CMOS Image Sensor with Analog Two-Dimensional DCT-Based Compression Circuits for One-Chip Cameras, pp. 2030-2041, IEEE Journal of Solid-State Circuits, vol. 32, No. 12, Dec. 1997.

(Continued)

*Primary Examiner* — Roberto Velez
*Assistant Examiner* — Stephen Coleman
(74) *Attorney, Agent, or Firm* — Paratus Law Group, PLLC

(57) ABSTRACT

In order to improve imaging performance, an imaging apparatus is provided to include an image capturing unit configured to detect incident light and generate a raw image data, a compression unit configured to compress the raw image data to generate a coded data having a data amount smaller than that of the raw image data, and an output unit configured to output the coded data to a processing unit for processing the coded data. Furthermore, the image capturing unit, the compression unit, and the output unit are configured to be within a same semiconductor package.

16 Claims, 31 Drawing Sheets

(51) Int. Cl.
  *H04N 5/232*    (2006.01)
  *H04N 19/593*   (2014.01)
  *H04N 19/12*    (2014.01)
  *H04N 19/136*   (2014.01)
  *H04N 19/146*   (2014.01)
  *H04N 19/59*    (2014.01)
  *H04N 3/14*     (2006.01)

(52) U.S. Cl.
  CPC .......... *H04N 5/23235* (2013.01); *H04N 5/335* (2013.01); *H04N 19/12* (2014.11); *H04N 19/136* (2014.11); *H04N 19/146* (2014.11); *H04N 19/59* (2014.11); *H04N 19/593* (2014.11)

(56) References Cited

FOREIGN PATENT DOCUMENTS

| JP | 2003-234967 | 8/2003 |
|---|---|---|
| JP | 2006-025232 | 3/2006 |
| JP | 2007-143118 | 6/2007 |
| JP | 2009-130562 | 6/2009 |
| JP | 2009-290556 | 12/2009 |
| JP | 2012-164870 | 8/2012 |

OTHER PUBLICATIONS

L. Ferrigno, et al., Balancing computational and transmission power consumption in wireless image sensor networks, VECIMS 2005—IEEE International Conference on Virtual Environments, Human-Computer Interfaces, and Measurement Systems, Giardini Naxos, Italy, Jul. 18-20, 2005, pp. 61-66.

Jan. 12, 2016, Japanese Office Action for related JP Application No. 2012-254407.

Leon-Salas, et al., A CMOS Imager With Focal Plane Compression Using Predictive Coding, IEEE Journal of Solid-State Circuits, Nov. 2007, pp. 2555-2572, vol. 42—issue No. 11, IEEE.

Mar. 17, 2016, Japanese Office Action for related JP Application No. 2012-254407.

Jun. 15, 2016, Japanese communication for related JP application No. 2012-254407.

\* cited by examiner

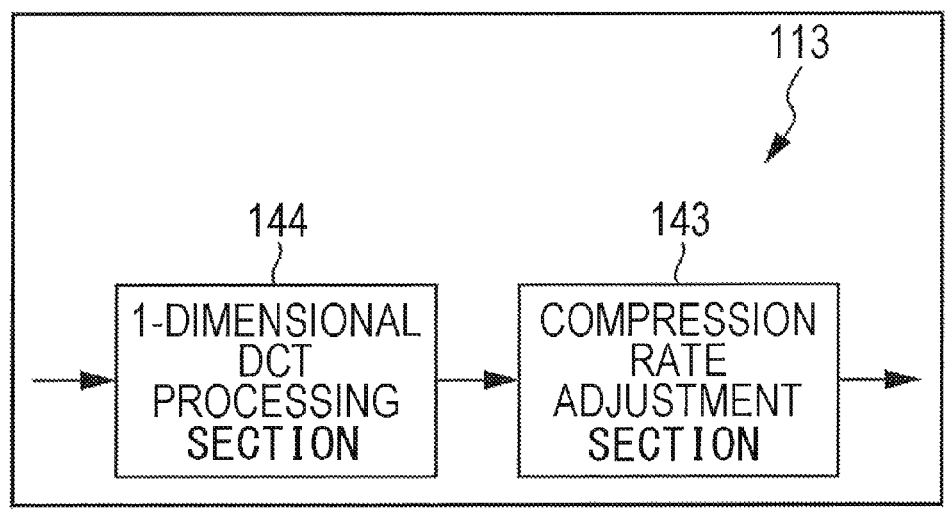
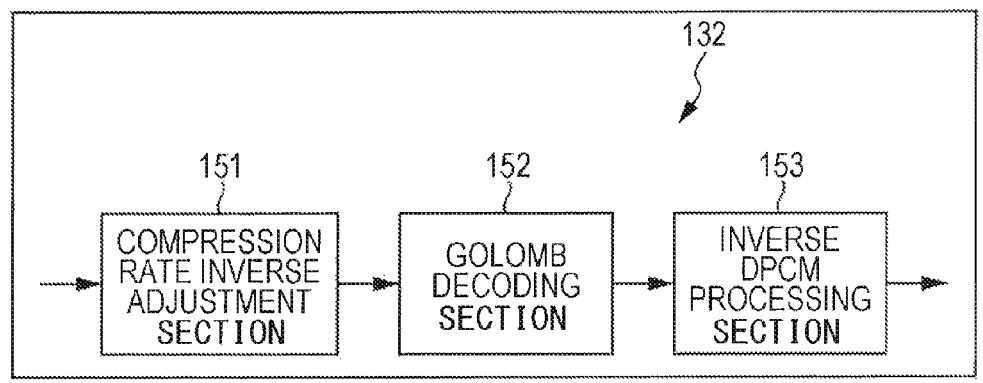

FIG. 8
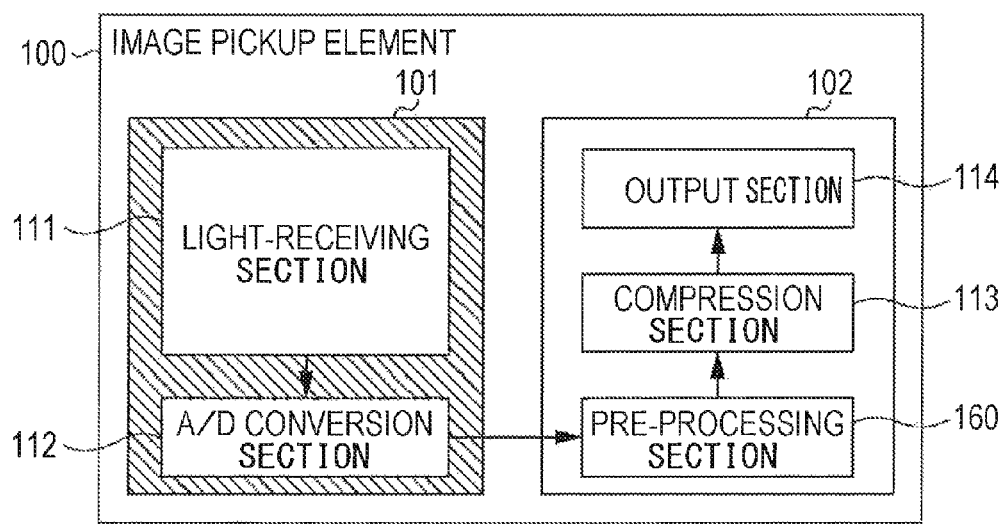
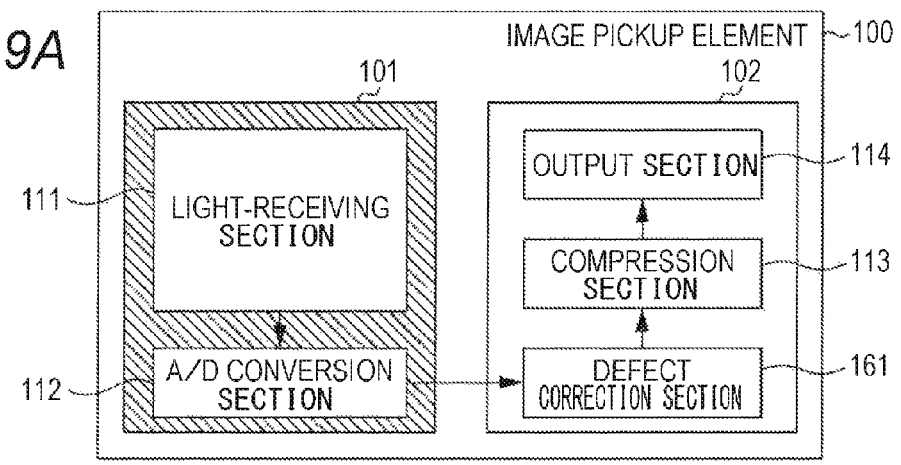
FIG. 9A

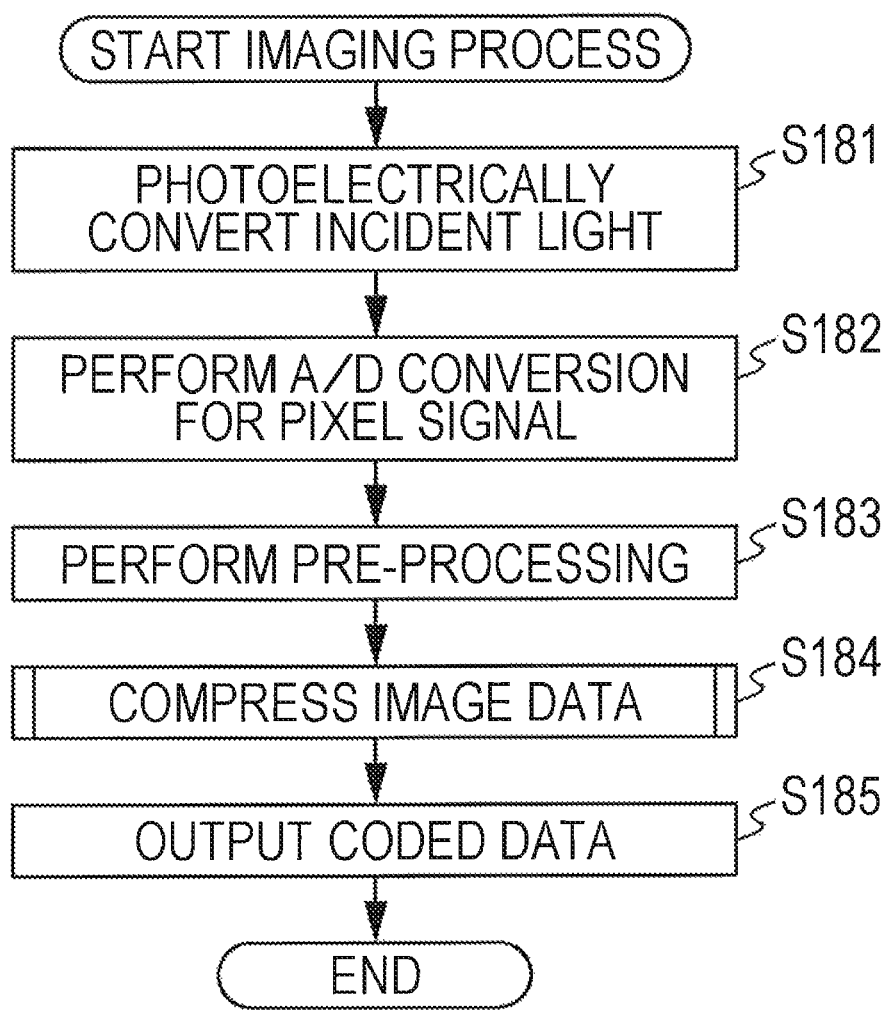

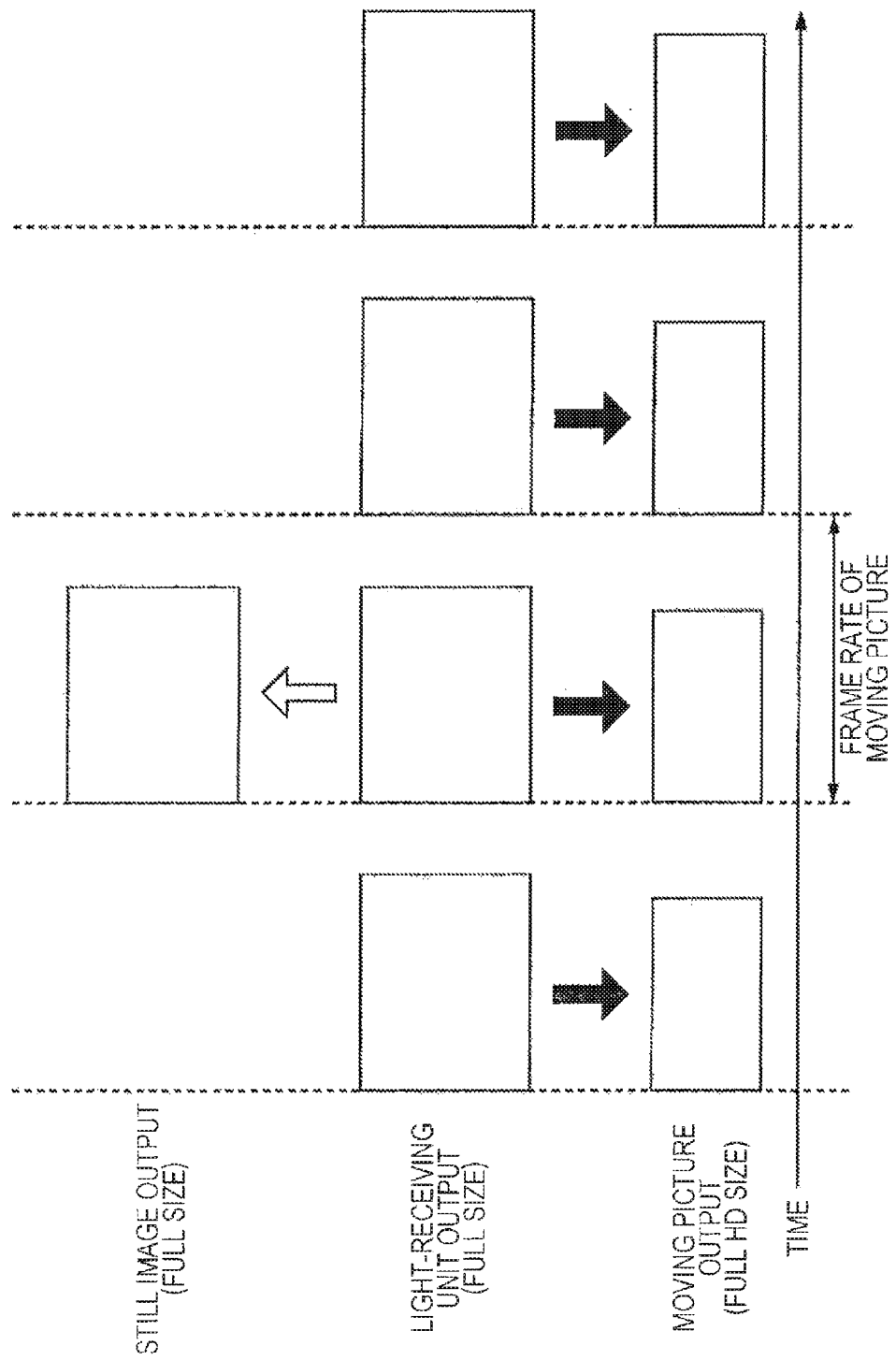

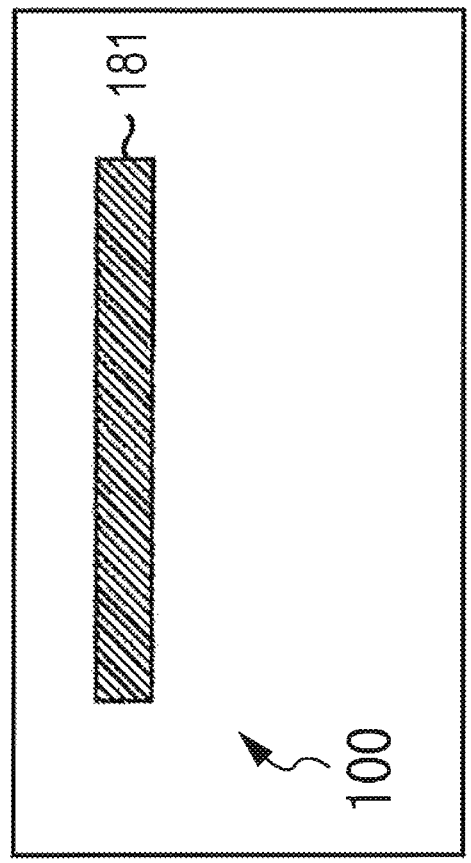

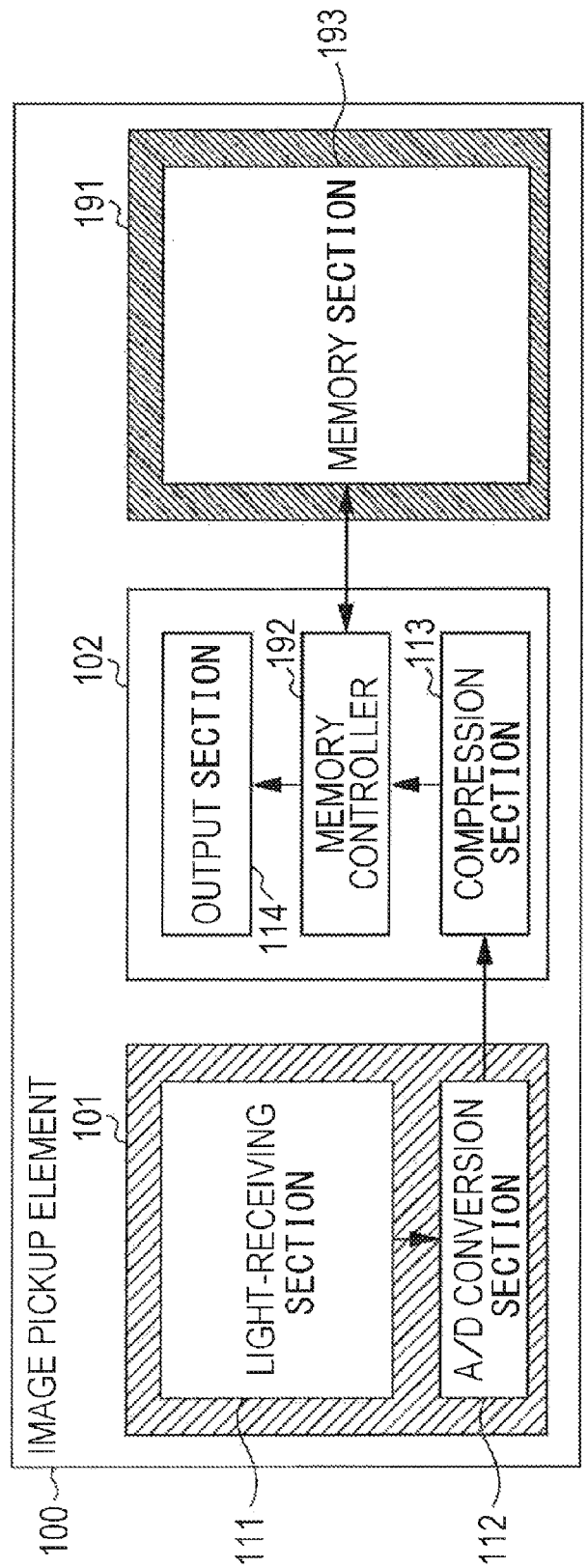

IMAGE PICKUP ELEMENT, IMAGING DEVICE, AND IMAGING METHOD

CROSS REFERENCE TO PRIOR APPLICATION

This application is a National Stage Patent Application of PCT International Patent Application No. PCT/JP2013/006671 (filed on Nov. 13, 2013) under 35 U.S.C. §371, which claims priority to Japanese Patent Application No. 2012-254407 (filed on Nov. 20, 2012), which are all hereby incorporated by reference in their entirety.

TECHNICAL FIELD

The present disclosure relates to an image pickup element, an imaging device, and an imaging method, and more particularly, to an image pickup element, an imaging device, and an imaging method capable of improving imaging performance.

BACKGROUND ART

In the related art, there is known an image sensor (image pickup element) modularized by encapsulating a semiconductor substrate where a light-receiving unit capable of photoelectrically converting incident light is formed.

Such a modularized image sensor photoelectrically converts incident light to create image data and outputs the image data in an uncompressed state (for example, as raw data) to a main board. In addition, signal processing such as demosaicing or defect correction for the image data is performed using a circuit on the main board (for example, refer to JP 2009-130562 A).

CITATION LIST

Patent Literature

PTL 1: JP 2009-130562 A

SUMMARY OF INVENTION

Technical Problem

In recent years, there has been a demand for improvement of imaging performance of an image sensor. For example, it has been demanded to increase resolution of an image and a processing speed from capturing of a still image to recording. In addition, it has been demanded to increase the number of continuous shots, a continuous shooting speed, and a frame rate of a moving picture. Furthermore, it has been demanded to obtain both a still image and a moving picture at the same time.

As the imaging performance improves, the amount of image data per frame increases. Meanwhile, image data for a single frame are created at a higher speed. That is, it is necessary to process a larger amount of data at a higher speed.

However, in the method known in the related art, a communication band in an interface between an image sensor and a main board is insufficient, so that it may be difficult to improve imaging performance of an image sensor.

In the related art, in order to transmit a larger amount of data to a main board from an image sensor, it is necessary to increase the number of I/O pins of an image sensor. However, in this case, a manufacturing cost of the image sensor may increase.

In view of such problems, the present technology provides an image pickup element, an imaging device, and an imaging method capable of improving imaging performance.

Solution to Problem

According to an aspect of the present technology, there is provided an imaging apparatus including: an image capturing unit configured to detect incident light and generate a raw image data; a compression unit configured to compress the raw image data to generate a coded data having a data amount smaller than that of the raw image data; and an output unit configured to output the coded data to a processing unit for processing the coded data, wherein the image capturing unit, the compression unit, and the output unit are configured to be within a same semiconductor package.

According to another aspect of the present technology, there is provided an image sensor including: an image capturing unit configured to detect incident light and generate a raw image data; a compression unit configured to compress the raw image data to generate a coded data having a data amount smaller than that of the raw image data; and an output unit configured to output the coded data to a bus for transmission to an image processing device.

According to another aspect of the present technology, there is provided an imaging method including: detecting incident light and generating a raw image data based on the detected incident light; compressing the raw image data to generate a coded data having a data amount smaller than that of the raw image data; and outputting the coded data for further processing of the coded data, wherein the generated raw image data is not transmitted over any bus prior to compression.

According to another aspect of the present technology, there is provided a non-transitory computer-readable medium embodied with a program, which when executed by a computer, causes the computer to perform a method including: detecting incident light and generating a raw image data based on the detected incident light; compressing the raw image data to generate a coded data having a data amount smaller than that of the raw image data; and outputting the coded data for further processing of the coded data, wherein the generated raw image data is not transmitted over any bus prior to compression.

Advantageous Effects of Invention

According to the present technology, it is possible to improve imaging performance.

BRIEF DESCRIPTION OF DRAWINGS

FIG. 2B is a diagram illustrating a main configuration example of a compression section.
FIG. 3A is a diagram illustrating a main configuration example of a decompression section.

FIG. 8 is another exemplary configuration of the image pickup element.

FIG. 9A is a diagram illustrating a more specific example of the pre-processing section.

FIG. 10 is a flowchart illustrating another exemplary imaging process flow.

FIG. 11 is a diagram illustrating a processing example of a moving picture and a still image.

FIG. 14B is a diagram illustrating still another exemplary configuration of the image pickup element.

FIG. 15A is a diagram illustrating still another exemplary configuration of the image pickup element.

DESCRIPTION OF EMBODIMENTS

Hereinafter, embodiments of this disclosure (hereinafter referred to as embodiments) will be described. Description will be made in the following sequence.

1. First Embodiment (Image Pickup Element)
2. Second Embodiment (Imaging Device)
3. Third Embodiment (Coding Section/Decoding Section)

1. First Embodiment

Image Pickup Element

Figure 1A:
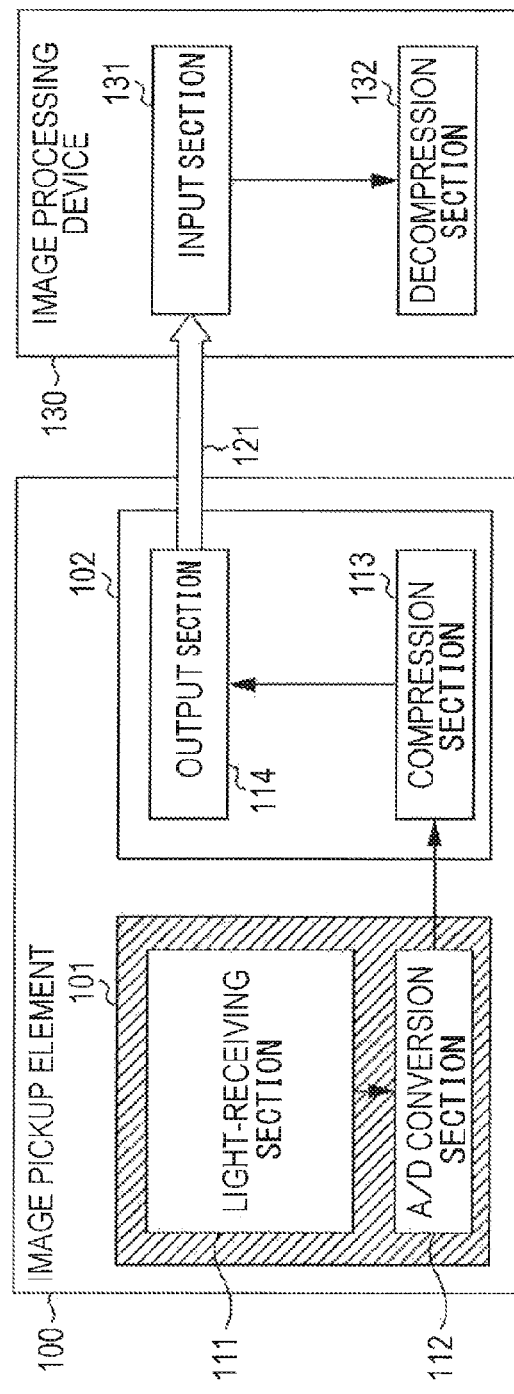
FIG. 1A is a diagram illustrating a main configuration example of an image pickup element.
Figure 1B:
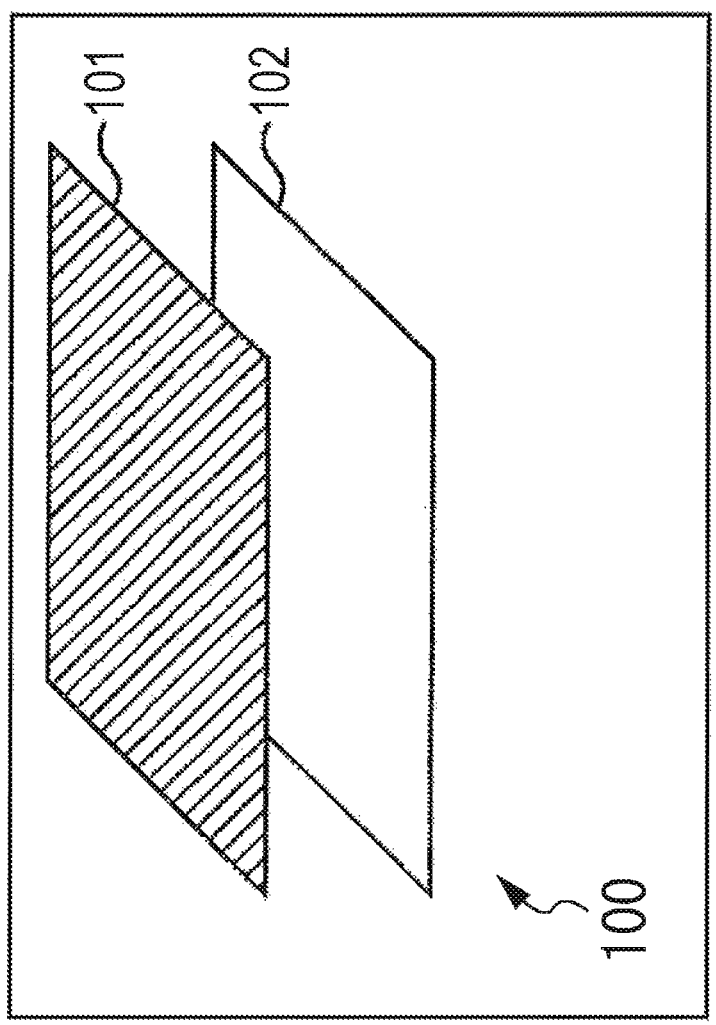
FIG. 1B is a diagram illustrating a main configuration example of an image pickup element.
Figure 1C:
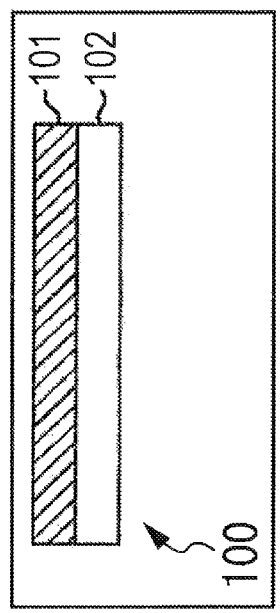
FIG. 1C is a diagram illustrating a main configuration example of an image pickup element.

FIGS. 1A-1C are a block diagram illustrating a main configuration example of an embodiment of an image pickup element according to the present technology. The image pickup element 100 of FIG. 1A-1C is an image sensor that photographically captures an object to obtain digital data (image data) of the photographic image and outputs the image data. The image pickup element 100 is a certain image sensor. For example, the image pickup element 100 may be an image sensor made of a complementary metal oxide semiconductor (CMOS), a charge coupled device (CCD), or the like.

As illustrated in FIG. 1A, the image pickup element 100 has a semiconductor substrate 101 indicated by a hatched portion and a semiconductor substrate 102 indicated by a blank portion. The semiconductor substrates 101 and 102 are encapsulated while they are overlapped with each other as illustrated in FIG. 1B to achieve modularization (integration).

That is, as illustrated in FIG. 1C, the semiconductor substrates 101 and 102 may form a multilayer structure (stack structure). A circuit formed in the semiconductor substrate 101 and a circuit formed in the semiconductor substrate 102 may be connected to each other through a via-hole (VIA) and the like.

In this manner, the image pickup element 100 may be an integrated module (also referred to as a large scale integration (LSI) chip) obtained by forming the semiconductor substrates 101 and 102 in a multilayer structure. If the semiconductor substrates 101 and 102 form a multilayer structure in this manner inside the module, a circuit having a larger size can be mounted without increasing a size of the semiconductor substrate in the image pickup element 100. That is, using the image pickup element 100, it is possible to mount a circuit having a larger size while minimizing a cost increase.

As illustrated in FIG. 1A, a light-receiving section 111 and an A/D conversion section 112 may be formed in the semiconductor substrate 101. In addition, a compression section 113 and an output section 114 may be formed in the semiconductor substrate 102.

The light-receiving section 111 receives incident light and performs photoelectrical conversion. The light-receiving section 111 has a plurality of unit pixels having a photoelectric conversion element such as a photo diode. Charges corresponding to the incident light are accumulated in each unit pixel through photoelectrical conversion. The light-receiving section 111 supplies the charges accumulated in each unit pixel to the A/D conversion section 112 as an electric signal (pixel signal).

The A/D conversion section 112 performs analog-digital conversion for each pixel signal supplied from the light-receiving section 111 to create digital pixel data. The A/D conversion section 112 supplies a set of pixel data of each unit pixel created in this manner to the compression section 113 as image data. That is, the compression section 113 is supplied with raw data before demosaicing.

The compression section 113 creates coded data by compressing the image data (raw data) supplied from the A/D conversion section 112 using a predetermined method. The data amount of this coded data is smaller than that of the image data before the compression. That is, the compression section 113 reduces the data amount of the image data.

As illustrated in FIG. 1A, the compression section 113 may be mounted on the image pickup element 100. That is, the compression section 113 may be implemented as a circuit embedded in the image pickup element 100 or software executed inside the image pickup element 100. For this reason, the compression method using the compression section 113 is basically set in an arbitrary manner. However, as described above, it is necessary that the compression section 113 can be mounted inside the image pickup element 100 (in the module). In embodiments, the light-receiving section 111 and the compression section 113 may be configured to be within a same semiconductor package or on a same chip. With such a configuration, for example, the image pickup element 100 may be configured so as to allow image data to be obtained and then compressed without having to ever send the data through a bus in this whole process.

As a representative image data compression method, there is known, for example, a joint photographic experts group (JPEG) or a moving picture experts group (MPEG). Such a high technology compression method has a complicated processing and a large circuit size. Therefore, a manufacturing cost of the image pickup element 100 easily increases. For this reason, typically, it is difficult although not impossible to embed such a high technology compression method in the image pickup element 100 as a circuit or software. Furthermore, even when such a compression method is embedded, it is conceived that an unpractical case may occur such that a processing time (number of clocks) increases, a delay time is easily generated, and a coding process fails to keep up with a frame rate. In addition, since the compression rate has a best-effort priority level, it may not contribute to reduction of the number of pins or a bus band.

In this regard, the compression section 113 compresses the image data using a method that can be embedded at least in the image pickup element 100 (inside the module, particularly, in the semiconductor substrate 102 that forms a stack structure along with the semiconductor substrate 101 having the light-receiving section 111) with a short processing time (reduced number of clocks) through a simple process, compared to a high technology compression method such as JPEG or MPEG, although the high technology compression method such as JPEG or MPEG may also be embedded, if desired. In the following description, such a compression method will be referred to as "simplified compression". That is, the compression section 113 performs simplified compression for the image data (raw data) supplied from the A/D conversion section 112 to create coded data.

A specific compression method of this simplified compression may be arbitrarily set if it satisfies the aforementioned condition. For example, either a lossless method or a lossy method may be employed. However, typically, as a size of the semiconductor substrate 102 increases, a cost also increases. In addition, as a processing time (number of clocks) increases, a delay time increases. For this reason, in this simplified compression, it is desirable to employ a method having a simpler process and a shorter processing time.

For example, typically, the A/D conversion section 112 supplies the compression section 113 with pixel data (image data) of each unit pixel by arranging the pixel data on a 1-dimensional space (as a pixel data stream) in a predetermined sequence. However, if it is necessary to buffer (store) such image data at the time of compression, the processing time may increase accordingly. For this reason, in the simplified compression, it may be desirable to employ a method in which it is not necessary to buffer the image data (pixel data stream) supplied from the A/D conversion section 112 if possible, and the image data can be sequentially compressed. For example, in the simplified compression, a compression method using a differential pulse code modulation (DPCM) scheme or a compression method using a 1-dimensional discrete cosine transform (DCT) scheme may be employed. Details thereof will be described below.

Naturally, as an integration degree improves, a high compression method such as JPEG or MPEG may be employed as the compression method of the compression section 113 if embedding in the image pickup element 100 can be performed with a low cost, a delay time is within an allowable range, high-speed operation can be performed, and a sufficient compression rate can be obtained.

The compression section 113 supplies the output section 114 with the coded data obtained by performing simplified compression for the image data.

The output section 114 may include, for example, an I/O cell or an I/O pin. The output section 114 outputs the coded data supplied from the compression section 113 to an external side of the image pickup element 100. The coded data output from the output section 114 may be supplied to the input section 131 of the image processing device 130 via a bus 121.

The image processing device 130 is an apparatus that performs image processing for the image data obtained by the image pickup element 100. As illustrated in FIG. 1A, the image processing device 130 may include an input section 131 and a decompression section 132.

The input section 131 receives the coded data transmitted from the image pickup element 100 (output section 114) via the bus 121. The input section 131 supplies the obtained coded data to the decompression section 132.

The decompression section 132 decompresses the coded data supplied from the input section 131 using a method matching the compression method of the compression section 113 to recover the image data. That is, the decompression section 132 decompresses the coded data supplied from the input section 131 using a method matching the simplified compression of the compression section 113 to recover the image data. The recovered image data is processed, stored, or displayed, for example, using the image processing device 130 and the like.

In this manner, the image pickup element 100 compresses the image data obtained in the light-receiving section 111 inside the module (LSI chip) and outputs the image data having a reduced data amount. Therefore, a band of the bus 121 necessary to transmit the image data (coded data) is reduced. Accordingly, the image pickup element 100 can output a larger amount of data with a higher speed without changing a bandwidth of the bus 121. That is, the image pickup element 100 can output a larger amount of data with a higher speed without increasing the number of I/O pins or I/O cells of the output section 114, that is, without increasing cost.

In other words, using the image pickup element 100, it is possible to suppress an influence of the band limiting of the bus 121. Without increasing a cost (without increasing the number of I/O cells or I/O pins of the output section 114), it is possible to improve imaging performance. For example, it is possible to increase resolution of an image and a processing speed from capturing of a still image to recording. In addition, it is possible to increase the number of continuous shots, a continuous shooting speed, and a frame rate of a moving picture. Furthermore, it is possible to obtain both a still image and a moving picture at the same time.

<Compression Section>

Figure 2A:
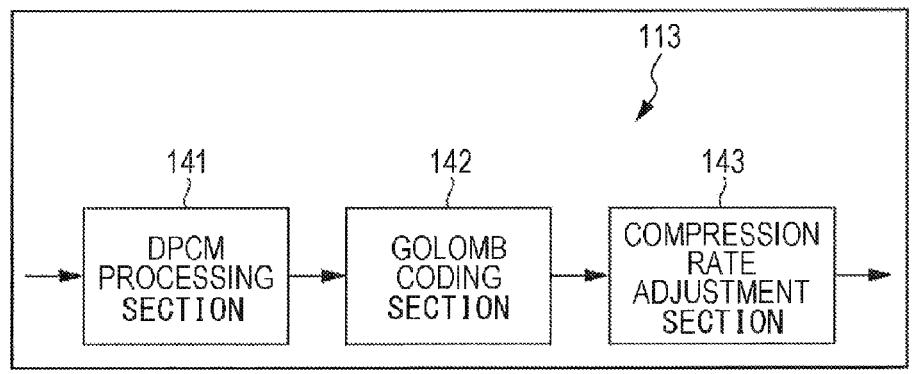
FIG. 2A is a diagram illustrating a main configuration example of a compression section.

FIGS. 2A-2B are a block diagram illustrating a main configuration example of the compression section 113 of FIG. 1A. In the example of FIG. 2A, the compression section 113 may include a DPCM processing section 141, a Golomb coding section 142, and a compression rate adjustment section 143.

The DPCM processing section 141 computes a difference value between continuous pixel data of the image data (pixel data stream arranged in a 1-dimensional space) supplied from the A/D conversion section 112. The DPCM processing section 141 supplies each of the computed difference values to the Golomb coding section 142.

The Golomb coding section 142 performs Golomb coding for each difference value supplied from the DPCM processing section 141. The Golomb coding section 142 supplies the Golomb code (coded data) to the compression rate adjustment section 143.

The compression rate adjustment section 143 adjusts the compression rate of the coded data supplied from the Golomb coding section 142 to convert it into a predetermined compression rate. As a result, coded data is obtained by compressing the image data obtained by the light-receiving section 111 with a predetermined compression rate. A variable compression rate may be set. However, since a maximum transmittable bandwidth of the bus 121 is fixed due to a hardware factor, it is more desirable that the compression rate is fixed. The compression rate adjustment section 143 outputs the coded data obtained with the adjusted compression rate to the output section 114.

In this configuration, the compression section 113 can perform simplified compression for the image data (raw data).

In the example of FIG. 2B, the compression section 113 may include a 1-dimensional DCT processing section 144 and a compression rate adjustment section 143.

The 1-dimensional DCT processing section 144 performs a discrete cosine transform for the 1-dimensional image data supplied from the A/D conversion section 112. The 1-dimensional DCT processing section 144 supplies the 1-dimensional data subjected to the discrete cosine transform (hereinafter, also referred to as transformed data) to the compression rate adjustment section 143.

The compression rate adjustment section 143 adjusts the compression rate of the transformed data supplied from the 1-dimensional DCT processing section 144 to converts it to a predetermined compression rate. For example, the compression rate adjustment section 143 extracts an undesired high frequency component from the transformed data and discards it so that the transformed data has a predetermined compression rate. As a result, the compression rate adjustment section 143 can obtain the coded data compressed with a predetermined compression rate from the image data obtained by the light-receiving section 111.

The transformed data supplied from the 1-dimensional DCT processing section 144 is transformed to a frequency component by the 1-dimensional DCT processing section 144. Therefore, extraction is easily performed for each frequency component, and information is concentrated on a low frequency component. The high frequency component has a smaller influence on an image quality from the viewpoint of visualization (a degraded image quality is not easily visualized). For this reason, the compression rate adjustment section 143 extracts and discards, for example, a higher frequency component from the transformed data as necessary and adjusts the amount of the discarded data, so that it is possible to easily adjust the compression rate while visual degradation of an image quality is suppressed.

Similar to the case of FIG. 2A, a variable compression rate may be set. However, it is more desirable that the compression rate is fixed because a maximum transmittable bandwidth of the bus 121 is fixed due to a hardware factor. The compression rate adjustment section 143 outputs the coded data compressed with the adjusted compression rate to the output section 114.

Even in this configuration, the compression section 113 can perform simplified compression for image data (raw data).

Typically, in the image compression and the like, a 2-dimensional discrete cosine transform may be used. However, the 2-dimensional discrete cosine transform is more complicated compared to the 1-dimensional discrete cosine transform. Furthermore, a circuit size may increase. The 1-dimensional DCT processing section 144 performs a 1-dimensional discrete cosine transform for the image data. Therefore, it is possible to easily obtain the transformed data compared to the 2-dimensional discrete cosine transform. That is, it is possible to suppress a circuit size of the compression section 113 from increasing.

While two examples have been described hereinbefore, the simplified compression is not limited to such examples.

<Decompression Section>

Figure 3B:
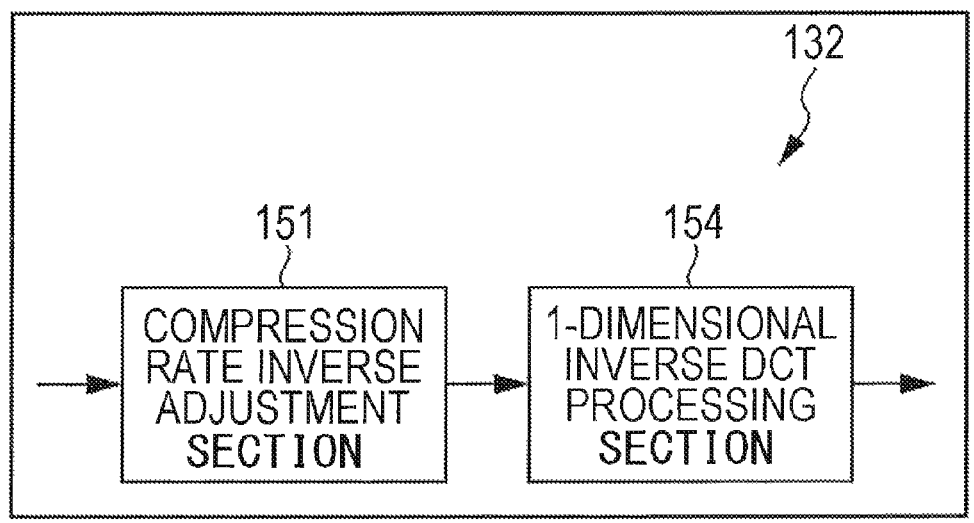
FIG. 3B is a diagram illustrating a main configuration example of a decompression section.

FIGS. 3A-3B are a block diagram illustrating a main configuration example of the decompression section 132. In the example of FIG. 3A, the decompression section 132 decompresses the coded data using a method matching the compression method of the compression section 113 in FIG. 2A. As illustrated in FIG. 3A, the decompression section 132 may include a compression rate inverse adjustment section 151, a Golomb decoding section 152, and an inverse DPCM processing section 153 in this case.

The compression rate inverse adjustment section 151 performs processing inverse to the processing of the compression rate adjustment section 143 for the coded data supplied from the input section 131 to recover the Golomb code generated by the Golomb coding section 142. The compression rate inverse adjustment section 151 supplies the recovered Golomb code to the Golomb decoding section 152.

The Golomb decoding section 152 decodes the Golomb code supplied from the compression rate inverse adjustment section 151 using a method matching the coding method of the Golomb coding section 142 to recover the difference value created by the DPCM processing section 141. The Golomb decoding section 152 supplies the recovered difference value to the inverse DPCM processing section 153.

The inverse DPCM processing section 153 performs inverse DPCM processing (inverse to the DPCM performed by the DPCM processing section 141) for the difference value supplied from the Golomb decoding section 152 to recover each pixel data. The inverse DPCM processing section 153 outputs a set of the recovered pixel data to the outside of the decompression section 132 as image data.

In this configuration, the decompression section 132 can appropriately decode the coded data created by the compression section 113. That is, the decompression section 132 can implement simplified compression of image data (raw data).

In the example of FIG. 3B, the decompression section 132 decompresses the coded data using a method matching the compression section 113 of the example of FIG. 2B. As illustrated in FIG. 3B, the decompression section 132 may include a compression rate inverse adjustment section 151 and a 1-dimensional inverse DCT (IDCT) section 154 in this case.

The compression rate inverse adjustment section 151 performs processing inverse to the processing of the compression rate adjustment section 143 for the coded data supplied from the input section 131 to recover the transformed data created by the 1-dimensional DCT processing section 144. The compression rate inverse adjustment section 151 supplies the recovered transformed data to the 1-dimensional inverse DCT processing section 154.

The 1-dimensional inverse DCT processing section 154 performs inverse DCT processing (inverse to the DCT of the 1-dimensional DCT processing section 144) for the transformed data supplied from the compression rate inverse adjustment section 151 to recover the pixel data. The 1-dimensional inverse DCT processing section 154 outputs a set of the recovered pixel data to the outside of the decompression section 132 as image data.

In this configuration, the decompression section 132 can appropriately decode the coded data created by the compression section 113. That is, the decompression section 132 can implement simplified compression for the image data (raw data).

<Flow of Imaging Process>

Next, an exemplary flow of the imaging process executed by the image pickup element 100 of FIG. 1A will be described with reference to the flowchart of FIG. 4.

This imaging process may be executed when the image pickup element 100 photographically captures an object and obtains the image data of the object image.

As the imaging process starts, in step S101, the light-receiving section 111 photoelectrically converts the incident light in each unit pixel of an effective pixel area. In step S102, the A/D conversion section 112 performs analog-digital conversion for the pixel signal (analog data) of each unit pixel obtained through the processing of step S101.

In step S103, the compression section 113 compresses the image data which is a set of the pixel data of the digital data obtained through the processing of step S102 to create coded data.

In step S104, the output section 114 outputs the coded data obtained through the processing of step S103 to the outside (bus 121) of the image pickup element 100.

As the processing of step S104 is terminated, the imaging process is terminated.

<Flow of Compression Process>

Next, an exemplary flow of the compression process executed in step S103 of FIG. 4 will be described with reference to the flowchart to FIGS. 5A-5B. First, an exemplary flow of the compression process executed by the compression section 113 in the example of FIG. 2A will be described with reference to the flowchart of FIG. 5A.

As the compression process starts, the DPCM processing section 141 of FIG. 2A performs DPCM processing for obtaining a difference value between pixel data continuous in the processing sequence for the image data in step S121.

In step S122, the Golomb coding section 142 performs Golomb coding for each difference value obtained through the processing of step S121.

In step S123, the compression rate adjustment section 143 adjusts a compression rate of the coded data, for example, by adding data to the Golomb code obtained through the processing of step S122.

Figure 4:
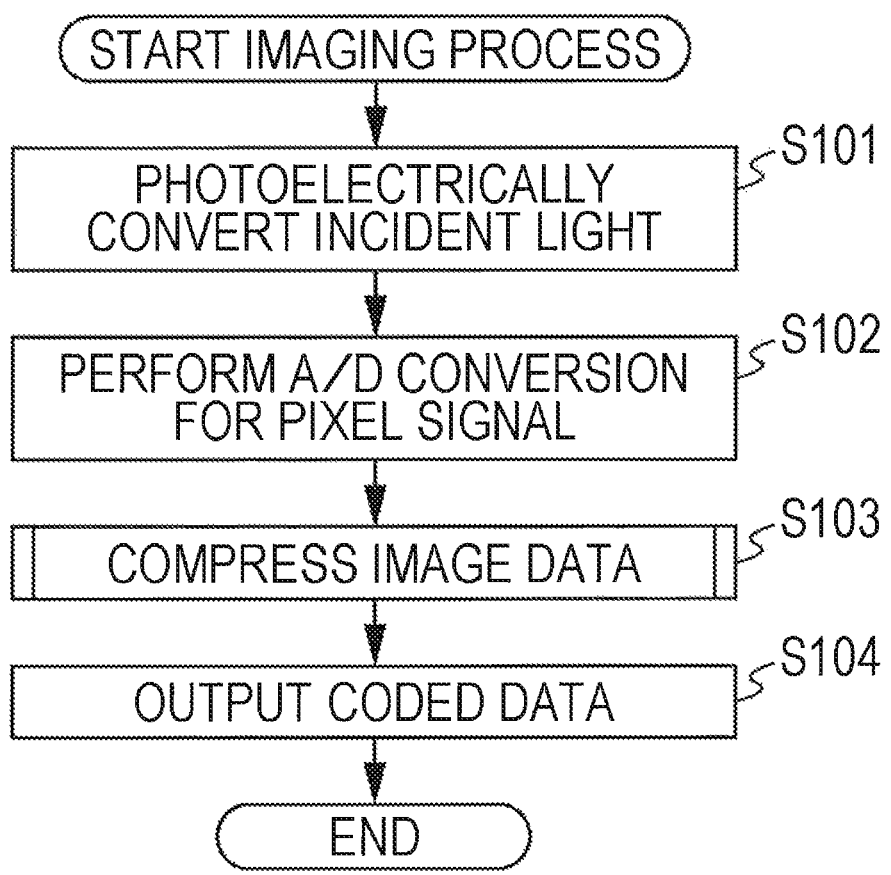
FIG. 4 is a flowchart illustrating an exemplary flow of an imaging process.

If the coded data of a predetermined compression rate is obtained from the image data input to the compression section 113 through the processing of step S123, the compression process is terminated, and the process returns to FIG. 4.

By executing each processing in this manner, the image pickup element 100 can output a larger amount of data with a higher speed without increasing a cost. Therefore, it is possible to improve imaging performance.

Next, an exemplary flow of the compression process executed by the compression section 113 in the example of FIG. 2B will be described with reference to the flowchart of FIG. 5B.

As the compression process starts, the 1-dimensional DCT processing section 144 of FIG. 2B performs a discrete cosine transform for the 1-dimensional image data in step S131.

In step S132, the compression rate adjustment section 143 adjusts a compression rate of the coded data in the transformed data obtained through the processing of step S131, for example, by discarding a high frequency component.

If the coded data of a predetermined compression rate is obtained from the image data input to the compression section 113 in the processing of step S132, the compression process is terminated, and the process returns to FIG. 4.

By executing each processing in this manner, the image pickup element 100 can output a larger amount data with a higher speed without increasing a cost. Therefore, it is possible to improve imaging performance.

<Flow of Image Processing>

Next, an exemplary flow of the image processing executed by the image processing device 130 of FIG. 1A will be described with reference to the flowchart of FIG. 6.

This image processing may be executed when the image processing device 130 processes the coded data output from the image pickup element 100.

As the image processing starts, the input section 131 of the image processing device 130 is output from the image pickup element 100 in step S141 and receives the coded data transmitted via the bus 121.

In step S142, the decompression section 132 decompresses the coded data received in the processing of step S141. In step S143, the image processing device 130 performs image processing for the image data obtained through the processing of step S142. As the processing of step S143 is terminated, the image processing is terminated.

<Flow of Decompression Process>

Next, an exemplary flow of the decompression process executed in step S142 of FIG. 6 will be described with reference to the flowchart of FIGS. 7A-7B. First, an exemplary flow of the decompression process executed by the decompression section 132 in the example of FIG. 3A will be described with reference to the flowchart of FIG. 7A.

As the decompression process starts, the compression rate inverse adjustment section 151 of FIG. 3A performs inverse adjustment (processing inverse to the processing of step S123 of FIG. 5A) of the compression rate of the coded data in step S161 to recover the Golomb code before adjustment of the compression rate.

In step S162, the Golomb decoding section 152 decodes each Golomb code obtained through the processing of step S161 to recover a difference value between pixel data.

Figure 5A:
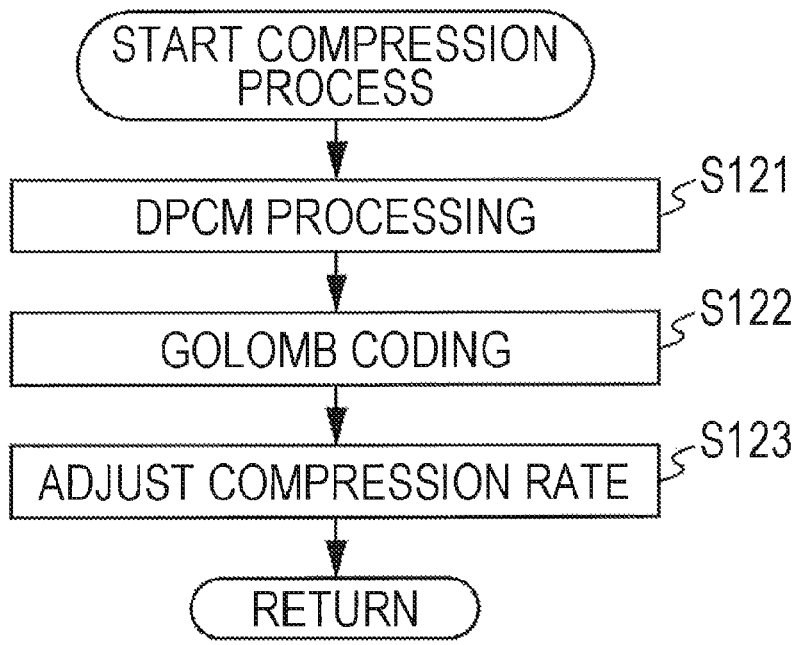
FIG. 5A is a flowchart illustrating an exemplary flow of a compression process.

In step S163, the inverse DPCM processing section 153 performs inverse DPCM processing (that is, processing inverse to the processing of step S121 of FIG. 5A) using the difference value obtained through the processing of step S162. In addition, the inverse DPCM processing section 153 recovers pixel data of each unit pixel, for example, by adding the difference values to each other.

Figure 6:
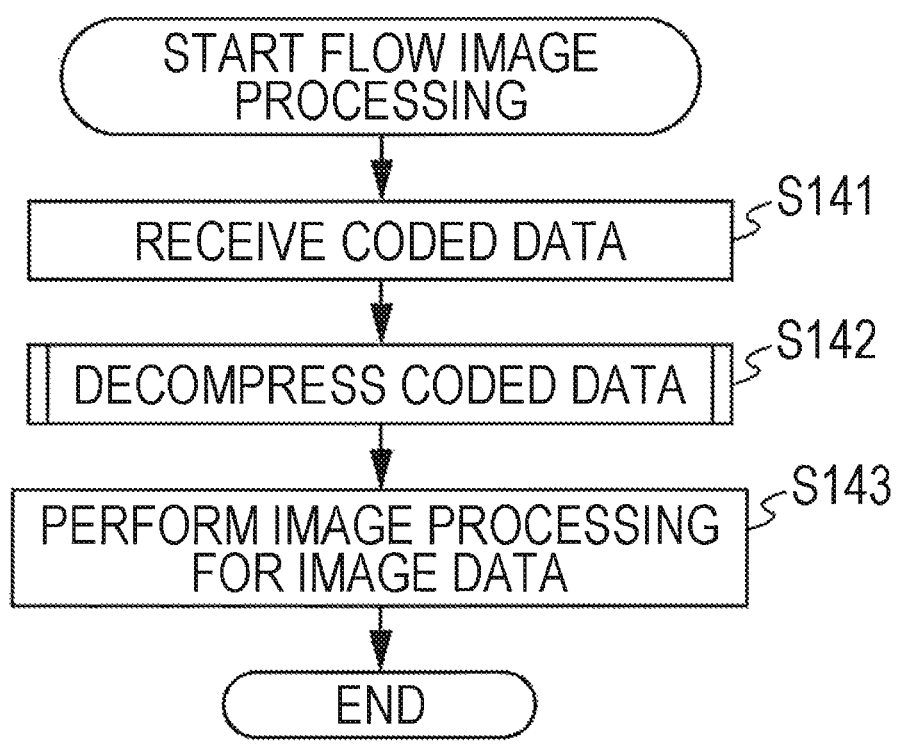
FIG. 6 is a flowchart illustrating an exemplary image processing flow.
Figure 7A:
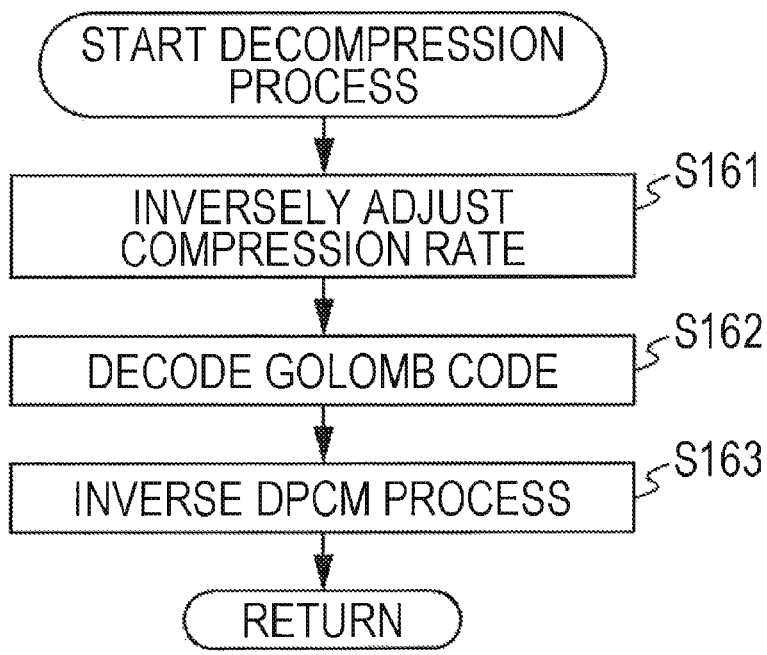
FIG. 7A is a flowchart illustrating an exemplary decompression processing flow.
Figure 7B:
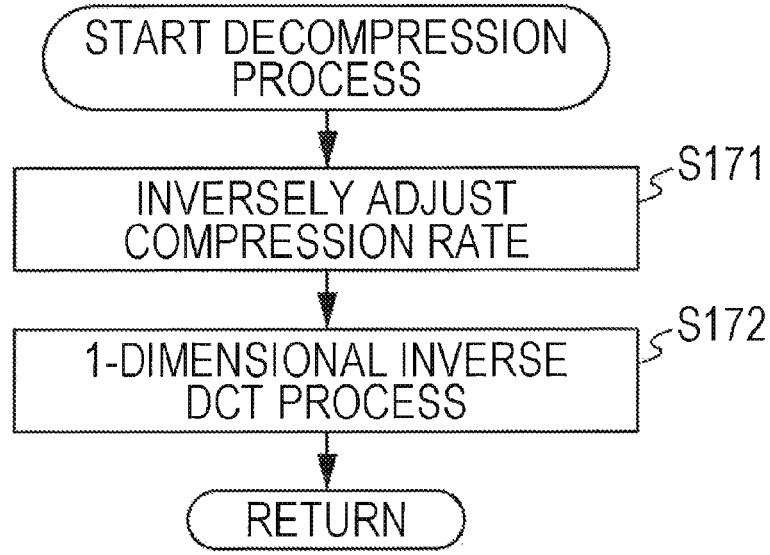
FIG. 7B is a flowchart illustrating an exemplary decompression processing flow.

If image data is obtained through the processing of step S163, the decompression process is terminated, and the process returns to FIG. 6.

By executing each processing as described above, the image processing device 130 can appropriately decode the coded data output from the image pickup element 100.

That is, the image processing device 130 can improve imaging performance of the image pickup element 100 without increasing a cost.

Next, an exemplary flow of the decompression process executed by the decompression section 132 in the example of FIG. 3B will be described with reference to the flowchart of FIG. 7B.

Figure 5B:
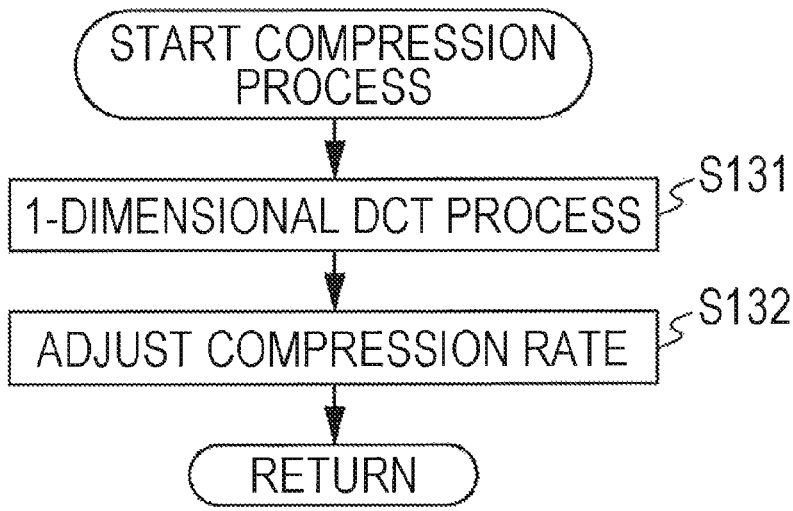
FIG. 5B is a flowchart illustrating an exemplary flow of a compression process.

As the decompression process starts, the compression rate inverse adjustment section 151 of FIG. 3B performs inverse adjustment (that is, processing inverse to the processing of step S132 of FIG. 5B) of the compression rate of the coded data in step S171 to recover the transformed data before adjustment of the compression rate.

In step S172, the 1-dimensional inverse DCT processing section 154 performs 1-dimensional inverse discrete cosine transform for the transformed data obtained through the processing of step S171 to recover the pixel data (that is, image data) of each unit pixel.

As the image data is obtained through the processing of step S172, the decompression process is terminated, and the process returns to FIG. 6.

By performing each processing as described above, the image processing device 130 can appropriately decode the coded data output from the image pickup element 100. That is, using the image processing device 130, it is possible to improve imaging performance of the image pickup element 100 without increasing a cost.

<Pre-Processing>

Alternatively, the image pickup element 100 may perform predetermined signal processing for the image data as pre-processing of the compression.

FIG. 8 is a diagram illustrating a main configuration example of the image pickup element 100 in that case. As illustrated in FIG. 8, in this case, the image pickup element 100 may include a pre-processing section 160 in addition to the configuration described above in conjunction with FIG. 1A.

The pre-processing section 160 performs predetermined signal processing for the image data (raw data) supplied from the A/D conversion section 112 as pre-processing. The pre-processing section 160 supplies the image data subjected to the pre-processing to the compression section 113.

Similar to the case of FIG. 1A, the compression section 113 compresses the image data supplied from the pre-processing section 160 using a predetermined method to create coded data and supplies the coded data to the output section 114.

Similar to the case of FIG. 1A, the output section 114 outputs the coded data supplied from the compression section 113 to the outside of the image pickup element 100.

Figure 9B:
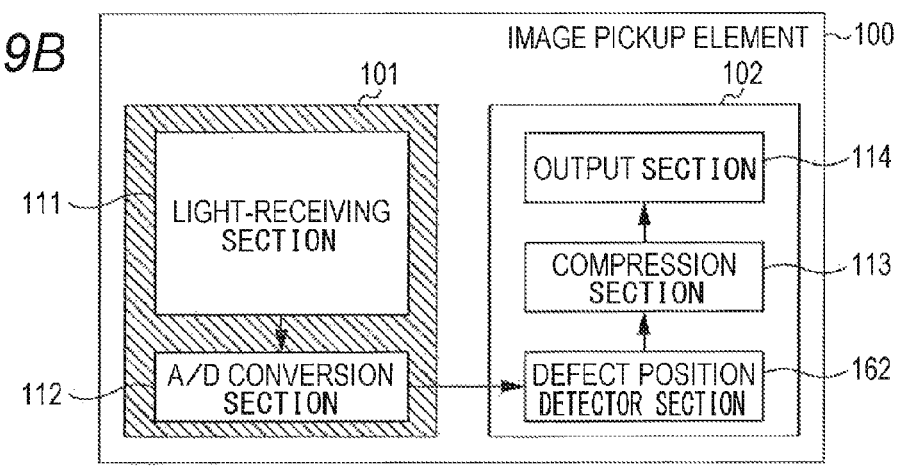
FIG. 9B is a diagram illustrating a more specific example of the pre-processing section.
Figure 9C:
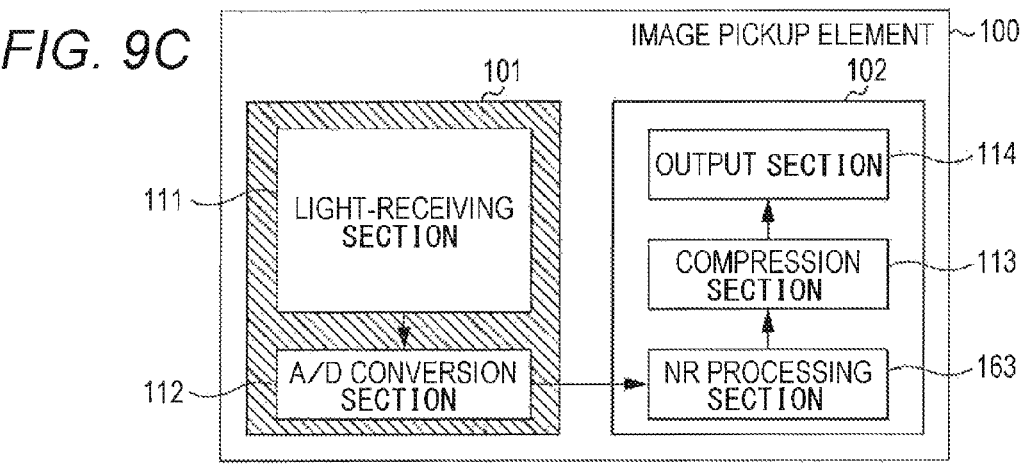
FIG. 9C is a diagram illustrating a more specific example of the pre-processing section.

FIGS. 9A-9C are a diagram illustrating a more specific example of the preprocessing section 160. In the case of FIG. 9A, the image pickup element 100 may include a defect correction section 161 as a pre-processing section 160.

The defect correction section 161 compares pixel data of a unit pixel (current unit pixel) as a processing target with pixel data of a neighboring pixel. If both levels are extremely different (for example, a level difference between the pixel data of the current unit pixel and the pixel data of the neighboring pixel is equal to or greater than a predetermined threshold value), the defect correction section 161 determines the current unit pixel as a defect pixel and corrects that pixel data. If the defect correction described above is performed for overall unit pixels, the defect correction section 161 supplies the image data subjected to the correction to the compression section 113.

In the case of FIG. 9B, the image pickup element 100 may include a defect position detector section 162 as a pre-processing section 160.

The defect position detector section 162 compares the pixel data of the current unit pixel with the pixel data of a neighboring pixel. If both levels are extremely different (for example, a level difference between the pixel data of the current unit pixel and the pixel data of the neighboring pixel is equal to or greater than a predetermined threshold value), the defect position detector section 162 determines the current unit pixel as a defect pixel. As the defect pixel is specified, the defect position detector section 162 supplies positional information thereof to the compression section 113 and outputs the positional information from the output section 114 to the outside of the image pickup element 100. The image processing device 130 specifies a position of the defect pixel based on this positional information output from the image pickup element 100 and corrects pixel data of a pixel of the specified position. That is, in this case, the image pickup element 100 (defect position detector section 162) just specifies a position of the defect pixel, and actual correction is performed by the image processing device 130.

In the case of FIG. 9C, the image pickup element 100 may include a noise reduction (NR) processing section 163 as a pre-processing section 160.

The NR processing section 163 performs, for the image data, a predetermined filtering process such as coring in which an edge is determined and smoothened or a median filtering in which a mean value of the pixel data of a plurality of neighboring pixels is applied to pixel data of the current unit pixel, to reduce a noise component included in the image data. The NR processing section 163 supplies the image data subjected to the filtering to the compression section 113.

The image pickup element 100 can suppress irregularity of the pixel data by performing defect pixel correction or a filtering process as described above before the compression. Therefore, it is possible to suppress a difference between pixel data and improve compression efficiency. In addition, it is possible to suppress a change of the value of the pixel data continuous in a processing sequence. Therefore, using the image pickup element 100, it is possible to reduce toggling of each bit and suppress power consumption.

Details of the pre-processing may be arbitrarily set and is not limited to the aforementioned three examples. Alternatively, a plurality of processing may be performed as pre-processing. For example, the pre-processing section 160 may perform a plurality of processing out of those of the aforementioned example as pre-processing. Naturally, details of each processing included in a plurality of the processing may be arbitrarily set.

Next, an exemplary flow of the imaging process executed by the image pickup element 100 of FIG. 8 will be described with reference to the flowchart of FIG. 10. This imaging process may be executed when the image pickup element 100 photographically captures an object and obtains image data from the object image.

As the imaging process starts, the processing of steps S181 and S182 is executed as in the processing of steps S101 and S102, respectively, of FIG. 4. In step S183, the preprocessing section 160 performs pre-processing for the image data obtained through the processing of step S182.

If the processing of step S183 is terminated, the processing of steps S184 and S185 is performed as in the processing of the steps S103 and S104, respectively, of FIG. 4.

By executing each processing as described above, it is possible to improve compression efficiency and suppress power consumption using the image pickup element 100.

In a case where the defect correction section 161 or the NR processing section 163 is applied as the pre-processing section 160 as described above in conjunction with FIGS. 9A to 9C, defect pixel correction or NR processing may be performed in the processing of step S183 described above.

<Processing of Moving Picture and Still Image>

The image data obtained by the image pickup element 100 through imaging may be either a moving picture or a still image. In addition, the image pickup element 100 may obtain both a moving picture and a still image. For example, the image pickup element 100 may capture a still image while shooting a moving picture. In this case, the image pickup element 100 is necessary to output image data of a moving picture and also output image data of a still image as illustrated in FIG. 11. That is, in this case, the image pickup element 100 needs to output a larger amount image data compared to a case where only image data of a moving picture is output.

Meanwhile, typically, a still image is displayed or processed at high resolution in many cases, compared to a moving picture. For this reason, in a case where both a moving picture and a still image are imaged, an image of the image data obtained by the light-receiving section 111 needs to have a higher resolution than resolution of the moving picture and resolution of the still image (at least equal to the resolution of the still image). However, even in a case where the image of the image data obtained by the light-receiving section 111 is output as a moving picture, the image pickup element 100 unnecessarily outputs a moving picture at high resolution if the image is output from the image pickup element 100 at that resolution. That is, the image pickup element 100 inevitably outputs a large amount of data per section time. Therefore, a band shortage may occur.

For example, it is assumed that, as illustrated in FIG. 11, resolution of the image of the image data obtained by the light-receiving section 111 is set to a full size, and the image pickup element 100 outputs the still image still at resolution of the full size. In this case, if it is assumed that the image pickup element 100 also outputs a moving picture at resolution of the full size, the data amount is significantly large relative to the bandwidth of the bus 121, so that it may be difficult to output image data of each frame within time corresponding to the frame rate (without a delay). In particular, in a case where both a moving picture and a still image are output at the same time as in the example of FIG. 11, the output data amount further increases. Therefore, it may be more difficult to output image data of each frame without a delay.

In this regard, in a case where the image obtained by the light-receiving section 111 is a moving picture as in the example of FIG. 11, the image pickup element 100 may perform an image size reduction process for the image data of each frame in a module before compression. In the case of the example of FIG. 11, the image pickup element 100 reduces each frame image having an image size of a full size into a full HD size smaller than the full size before compression.

In this manner, using the image pickup element 100, it is possible to reduce a data amount of image data of a moving picture in a module before compression and suppress an influence of a band limiting of the bus 121. In addition, without increasing a cost (without increasing the number of I/O cells or I/O pins of the output section 114), it is possible to improve imaging performance for a moving picture. For example, it is possible to increase a frame rate of a moving picture or capture a still image while a moving picture is taken.

In a case where the image captured using the image pickup element 100 is a still image, reduction processing for such an image is omitted, and the corresponding image data is directly compressed at resolution at the time of capturing. In the case of the example of FIG. 11, the image pickup element 100 outputs a still image at a full size resolution. Therefore, using the image pickup element 100, it is possible to improve imaging performance of a moving picture while degradation of an image quality of a still image is suppressed.

Figure 12:
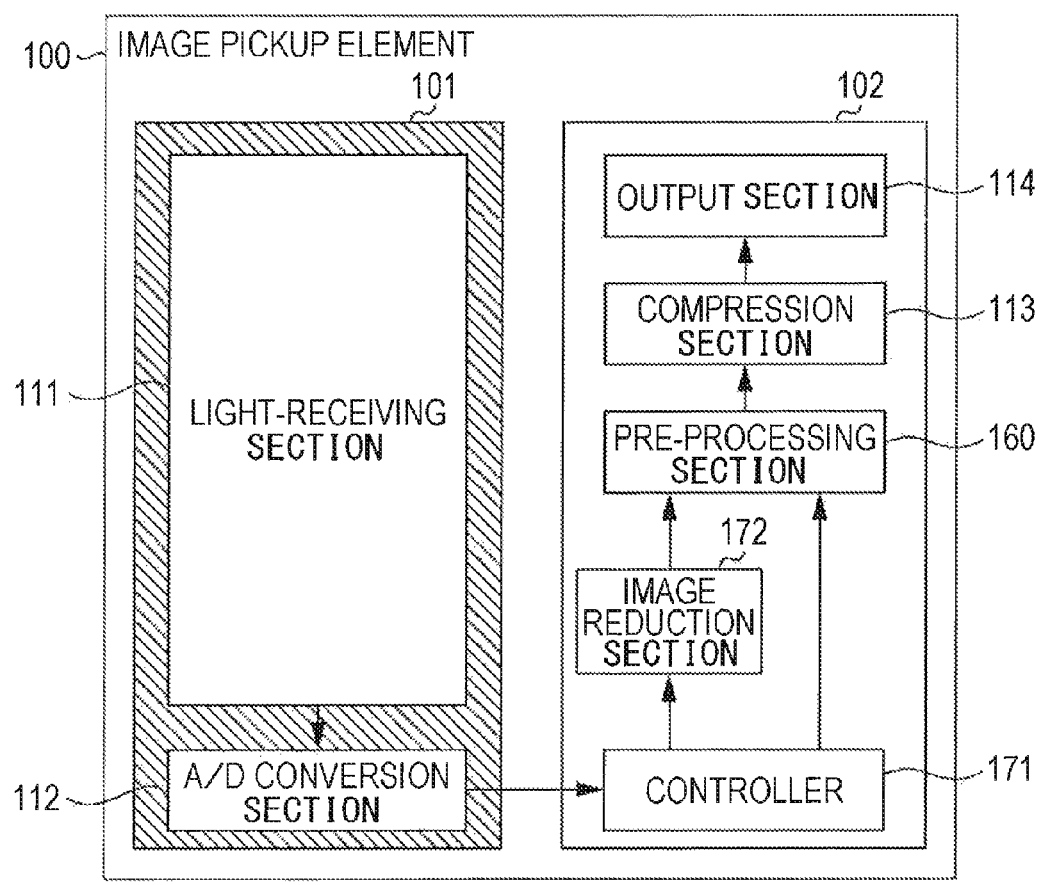
FIG. 12 is a diagram illustrating still another exemplary configuration of the image pickup element.

FIG. 12 is a block diagram illustrating a main configuration example of the image pickup element 100 in a case as described above in relation to FIG. 11. In the case of the example of FIG. 12, the image pickup element 100 may include a controller 171 and an image reduction section 172 in addition to the configuration described above in conjunction with FIG. 1A. In other words, the image pickup element 100 may be implemented to include the controller 171 and the image reduction section 172 as the preprocessing section 160 of FIG. 8.

The controller 171 determines whether or not an image of the image data (raw data) supplied from the A/D conversion section 112 is a frame image (of a moving picture). This determination may be performed in an arbitrary manner. For example, the controller 171 may reference metadata such as a parameter set or a header and makes this determination based on information on an image such as format information included in the metadata. Alternatively, the controller 171 may determine which of a moving picture or a still image is the image data by analyzing the image data.

If it is determined that the image data is (a frame image of) a moving picture, the controller 171 supplies the image data (raw data) supplied from the A/D conversion section 112 to the image reduction section 172. Otherwise, if it is determined that the image data is a still image, the controller 171 supplies the image data (raw data) supplied from the A/D conversion section 112 to the pre-processing section 160.

The image reduction section 172 performs image size reduction processing for the image data supplied from the controller 171. A method of reducing this image size may be arbitrarily set. For example, the image pickup element 100 may cut out a part of the frame image and thin the pixel at a predetermined interval to reduce an image size of each frame image. Similarly, an image size after the reduction may be arbitrarily set.

The image reduction section 172 supplies the image data (image data of a frame image) having a reduced image size to the pre-processing section 160.

The pre-processing section 160 performs predetermined signal processing as preprocessing before compression, for image data of a still image supplied from the controller 171 or the image data of a frame image of a moving picture supplied from the image reduction section 172. The pre-processing section 160 supplies the image data subjected to the pre-processing to the compression section 113.

Similar to the case of FIG. 8, the compression section 113 creates coded data by compressing the image supplied from the pre-processing section 160 using a predetermined method and supplies the coded data to the output section 114.

Similar to the case of FIG. 1A, the output section 114 outputs the coded data supplied from the compression section 113 to the outside of the image pickup element 100.

As described above, the image pickup element 100 determines whether or not the image of the image data obtained by the light-receiving section 111 in a module (LSI chip) is (a frame image of) a moving picture or still image. If it is determined that the image data is a moving picture, the image pickup element 100 reduces the image size, compresses the image, and outputs the image. In addition, if it is determined that the image of the image data obtained by the light-receiving section 111 is a still image, the image pickup element 100 compresses the image data and outputs the image without reducing the image size.

In this manner, using the image pickup element 100, it is possible to improve imaging performance for a moving picture while degradation of an image quality of a still image is suppressed.

Figure 13:
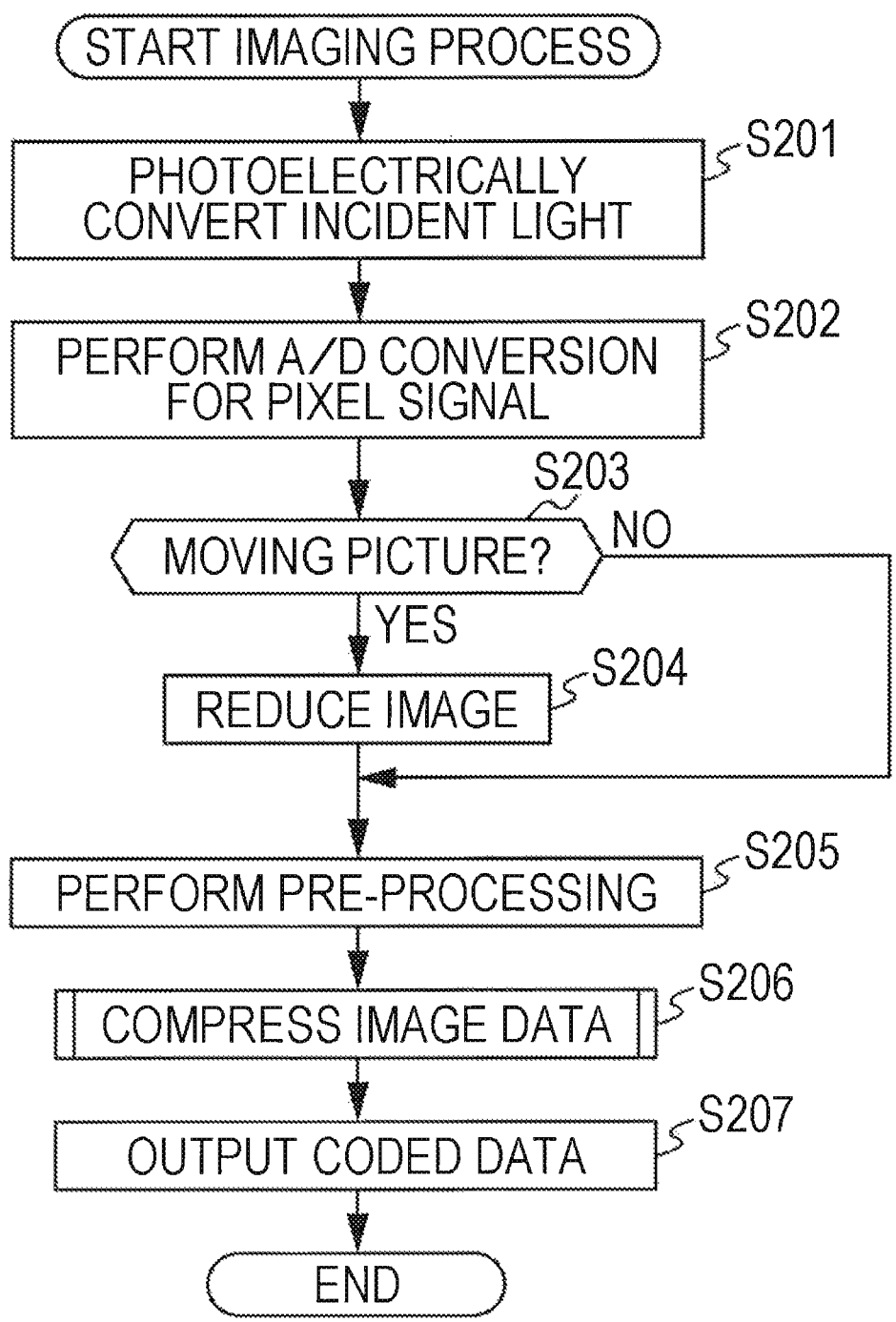
FIG. 13 is a flowchart illustrating still another exemplary imaging process flow.

Next, an exemplary flow of the imaging process executed by the image pickup element 100 of FIG. 12 will be described with reference to the flowchart of FIG. 13. This imaging process may be executed when the image pickup element 100 photographically captures an object and obtains image data of the object image.

As the imaging process starts, the processing of steps S201 and S202 is executed as in the processing of steps S181 and S182, respectively, of FIG. 10. In step S203, the controller 171 determines whether or not the image of the image data obtained through the processing of step S202 is a frame image of a moving picture or a still image. If it is determined that the image is a moving picture, the process advances to step S204.

In step S204, the image reduction section 172 reduces an image of the image data obtained through the processing of step S202. As the processing of step S204 is terminated, the process advances to step S205. Otherwise, if it is determined that the image of the image data obtained through the processing of step S202 is a still image in step S203, the process advances to step S205.

For the image data of the frame image of the moving picture having a reduced image size or the image data of the still image having an unreduced image size, the processing of steps S205 to S207 is performed as in the processing of steps S183 to S185 of FIG. 10, respectively.

If each processing is executed as described above, it is possible to improve imaging performance for a moving picture, while degradation of an image quality of a still image is suppressed, using the image pickup element 100.

<Single Substrate>

Figure 14A:
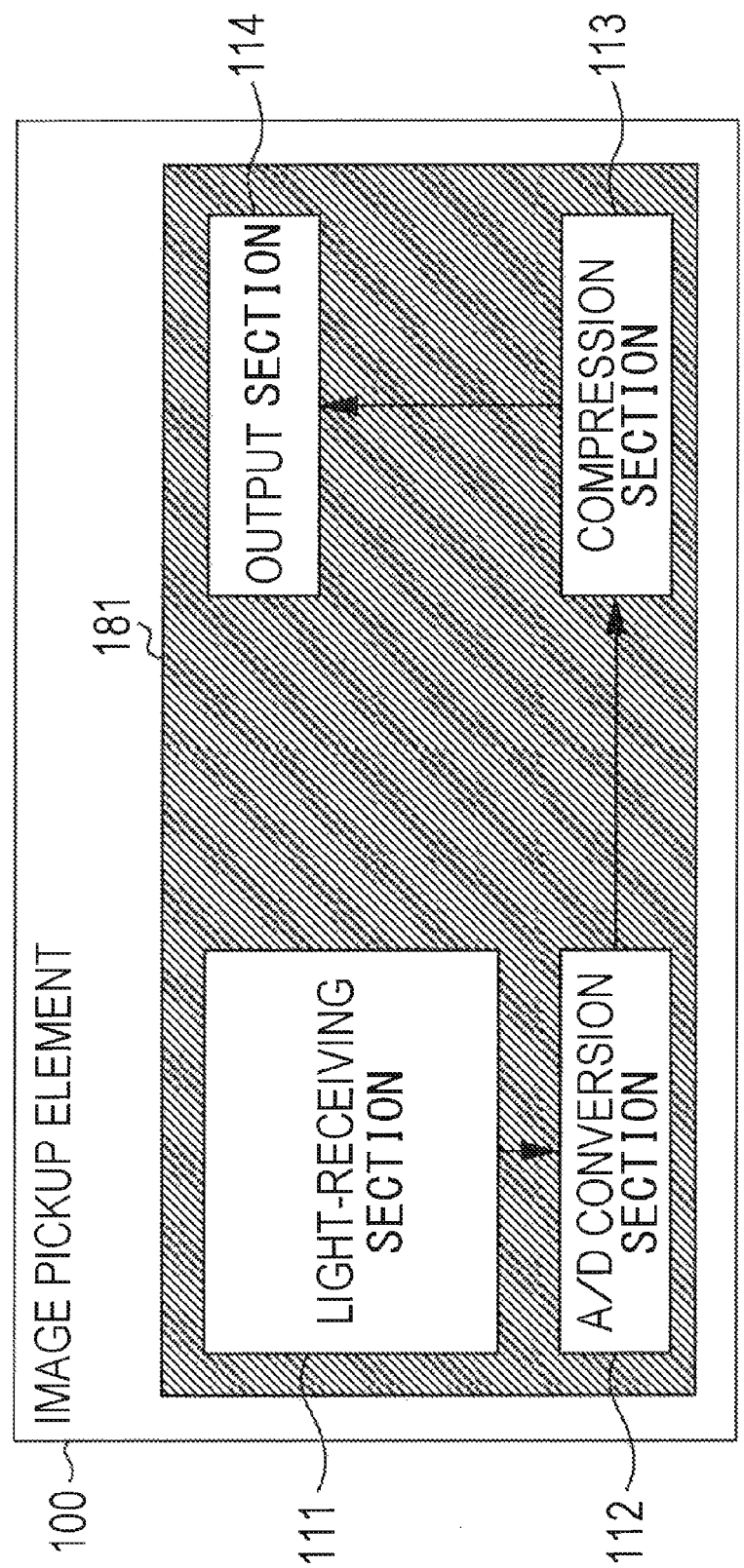
FIG. 14A is a diagram illustrating still another exemplary configuration of the image pickup element.

Although description has been made by assuming that the image pickup element 100 has a pair of semiconductor substrates 101 and 102 overlapped with each other in the aforementioned description, the number of semiconductor substrates of the image pickup element 100 may be set arbitrarily. For example, as illustrated in FIGS. 14A-14B, the light-receiving section 111, the A/D conversion section 112, the compression section 113, and the output section 114 may be formed in a single semiconductor substrate. Furthermore, the light-receiving section 111, the A/D conversion section 112, the compression section 113, and the output section 114 may configured to be within a same semiconductor package or on a chip. With such a configuration, for example, the image pickup element 100 may be configured so as to allow image data to be obtained and then compressed without having to ever send the data through a bus in this whole process.

In the example of FIG. 14A, the light-receiving section 111, the A/D conversion section 112, the compression section 113, and the output section 114 of the image pickup element 100 illustrated in FIG. 1A may be formed in the same semiconductor substrate 181. That is, the image pickup element 100 may be formed on a single semiconductor substrate 181. Therefore, as illustrated in FIG. 14B, the semiconductor substrate 181 does not have a stack structure.

However, since the circuit of the image pickup element 100 is similar to that of FIG. 1A, the image pickup element 100 can execute the imaging process similar to that of FIG. 4. That is, using the image pickup element 100, it is possible to output a larger amount of data with a higher speed and improve imaging performance without increasing a cost.

<Plurality of Substrates>

Figure 15B:
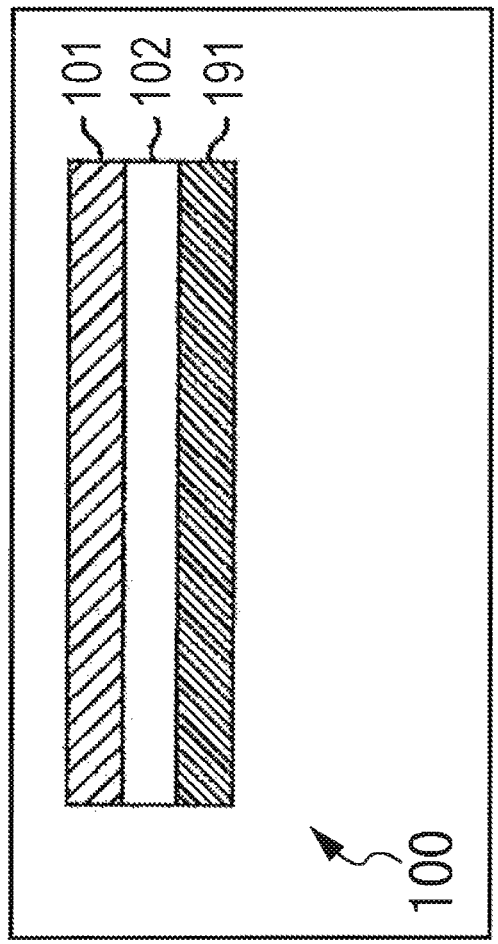
FIG. 15B is a diagram illustrating still another exemplary configuration of the image pickup element.

Naturally, the number of semiconductor substrates provided in the image pickup element 100 may also be two, three or more. FIGS. 15A-15B are a diagram illustrating a main configuration example of the image pickup element 100 in a case where the image pickup element 100 has three semiconductor substrates.

In the example of FIG. 15A, the image pickup element 100 may have a semiconductor substrate 191 illustrated as a densely hatched portion in addition to the semiconductor substrates 101 and 102. The circuit formed in the semiconductor substrate 191 may be connected to the circuit formed in the semiconductor substrates 101 and 102 through a via-hole.

As illustrated in FIG. 15B, the semiconductor substrates 101, 102, and 191 are encapsulated and modularized while they are overlapped with each other to form a multilayer structure (stack structure).

Any circuit may be formed in the third layer semiconductor substrate 191. In the case of the example of FIG. 15A, the semiconductor substrate 191 is provided with a memory section 193 that stores coded data obtained by compressing image data. In addition, the semiconductor substrate 102 may be further provided with a memory controller 192 that controls input or output operation of the data of memory section 193.

The memory controller 192 controls writing of data to the memory section 193 or reading of data from the memory section 193. For example, the memory controller 192 supplies the coded data supplied from the compression section 113 to the memory section 193 and stores the coded data. In addition, the memory controller 192 reads the coded data stored in the memory section 193, for example, at a predetermined timing or in response to another request and supplies the coded data to the output section 114.

The memory section 193 may include any (volatile or nonvolatile) memory device such as a hard disk or flash memory. The memory section 193 stores the coded data supplied from the memory controller 192 in a memory area thereof. The memory section 193 reads the coded data requested by the memory controller 192 from the memory area and supplies the coded data to the memory controller 192.

A capacity of the memory section 193 may be set arbitrarily. However, since the memory section 193 is provided in the semiconductor substrate 191 different from the semiconductor substrate 101 or 102, it is possible to relatively easily form a memory area having a high capacity. Therefore, for example, the memory section 193 may be frame memory that stores the image data of the frame image processed in the past.

In this manner, since the memory section 193 is provided within the module, the image pickup element 100 can output the coded data at an arbitrary timing.

As described above, since the compression section 113 compresses the image data, it is possible to reduce a data amount stored in the memory section 193. That is, it is possible to store a larger amount of data in the memory section 193. That is, it is possible to more effectively use the memory area of the memory section 193.

The data written to the memory section 193 and the data read from the memory section 193 may be transmitted via a memory bus (indicated by a bidirectional arrow between the memory controller 192 and the memory section 193). However, if the compression section 113 compresses the image data, the amount of data input to or output from the memory section 193 is reduced. Therefore, it is possible for the image pickup element 100 to reduce a band occupation of the memory bus caused by input/output operation of the coded data for the memory section 193. That is, using the image pickup element 100, it is possible to improve utilization efficiency of the memory bus and input/output coded data to/from the memory section 193 at a higher speed.

In particular, in the case of a bus that connects circuits of different semiconductor substrates as described in the example of FIG. 15A, the via-hole may be included in a part of the bus. In order to expand such a bus, the number of via-holes inevitably increases. However, if the number of via-holes increases, the circuit size (area) significantly increases. Therefore, in order to suppress a cost increase, it is desirable to suppress the number of via-holes from increasing. Therefore, if the compression section 113 compresses the image as described above, it is possible for the image pickup element 100 to improve utilization efficiency of the bus and more effectively control a cost increase.

Naturally, the circuit formed in the semiconductor substrate 191 may be arbitrarily configured, and other circuit elements other than the memory section 193 may be formed. That is, buses other than the memory bus may be used as a bus between the circuit configuration of the semiconductor substrate 102 and the circuit configuration of the semiconductor substrate 191 for transmitting the coded data.

Naturally, the image pickup element 100 may have a stack structure including four or more layers of the semiconductor substrate.

Next, an exemplary flow of the imaging process executed by the image pickup element 100 of FIGS. 15A-15B will be described with reference to the flowchart of FIG. 16. This imaging process may be executed when the image pickup element 100 photographically captures an object to obtain image data of the object image.

As the imaging process starts, the processing of steps S221 and S223 is executed as in the processing of steps S101 and S102, respectively, of FIG. 4. In step S224, the memory controller 192 stores the coded data obtained through the processing of step S223 in the memory section 193.

In step S225, the memory controller 192 reads the coded data stored in the memory section 193.

In step S226, the output section 114 outputs the coded data read from the memory section 193 through the processing of step S225.

By executing each processing as described above, the image pickup element 100 can output the coded data at an arbitrary timing.

<In-Module Compression>

The compression section that compresses the data transmitted via an in-module bus may be provided independently from the compression section that compresses the data output to the outside of the image pickup element 100.

Figure 17:
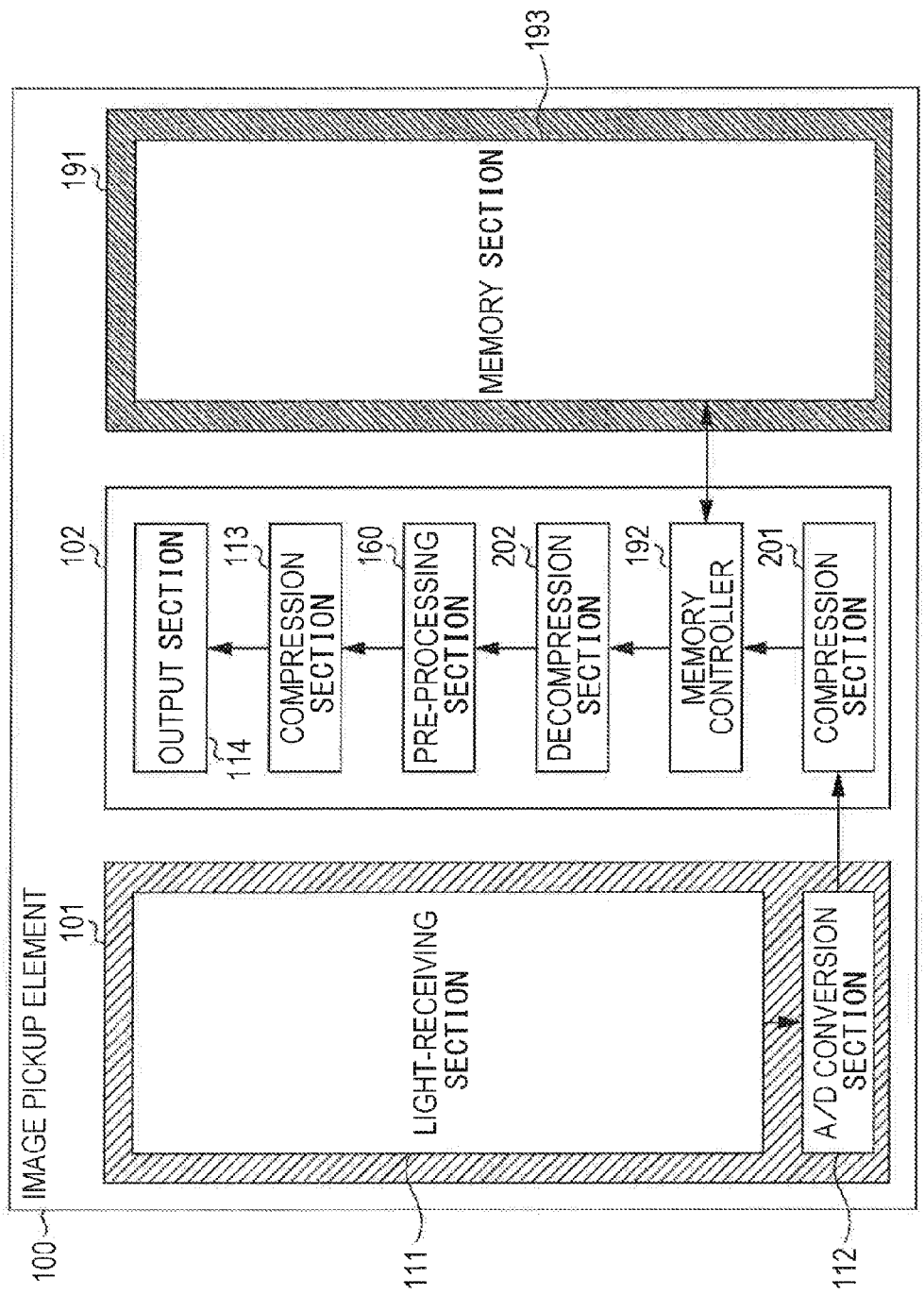
FIG. 17 is a diagram illustrating still another exemplary configuration of the image pickup element.

In the example of the example of FIG. 17, similar to the case of the example of FIG. 8, the image pickup element 100 may include a semiconductor substrate 102 and a preprocessing section 160. In addition, similar to the case of FIGS. 15A-15B, the image pickup element 100 may include semiconductor substrates 101, 102, and 191 constituting a stack structure, a memory controller 192 formed in the semiconductor substrate 102, and a memory section 193 formed in the semiconductor substrate 191. The memory section 193 stores the image data (coded data) provided to the preprocessing section 160. For this reason, the image pickup element 100 may further include a compression section 201 different from the compression section 113 in the semiconductor substrate 102, as illustrated in FIG. 17. In this case, it is necessary to supply the pre-processing section 160 with uncompressed image data. Therefore, as illustrated in FIG. 17, the image pickup element 100 may further include a decompression section 202 in the semiconductor substrate 102.

The compression section 201 creates coded data by compressing the image data (raw data) supplied from the A/D conversion section 112 using a predetermined method. The amount of the coded data is smaller than that of the image data before the compression. The compression section 201 reduces the amount of the image data. In addition, a compression method in the compression section 201 may be set arbitrarily. The computation method in the compression section 201 may be similar to or different from that of the compression section 113. However, the compression method of the compression section 201 is set to a simpler and easier compression method that can be embedded in a smaller size circuit due to the same reason as that of the compression section 113.

The compression section 201 supplies the coded data obtained by encoding the image data to the memory controller 192.

The memory controller 192 supplies the memory section 193 with the coded data supplied from the compression section 201. The memory section 193 stores the coded data supplied from the memory controller 192. The memory controller 192 reads the coded data stored in the memory section 193, for example, at a predetermined timing or in response to another request and supplies the coded data to the decompression section 202.

The decompression section 202 decompresses the coded data supplied from the memory controller 192 using a method matching the compression method of the compression section 201 to recover the image data. The decompression section 202 supplies the obtained image data to the pre-processing section 160. This image data has an uncompressed state. Similar to the case of FIG. 8, the pre-processing section 160 applies predetermined signal processing as pre-processing to the image data (raw data) supplied from the decompression section 202. The pre-processing section 160 supplies the image data subjected to the pre-processing to the compression section 113.

Similar to the case of FIG. 8, the compression section 113 compresses the image data supplied from the pre-processing section 160 using a predetermined method to create the coded data and supplies the coded data to the output section 114.

Similar to the case of FIG. 8, the output section 114 outputs the coded data supplied from the compression section 113 to the outside of the image pickup element 100.

In this manner, the pre-processing section 160 can perform signal processing using the data stored in the memory section 193 in the past. That is, the pre-processing section 160 can perform more various processing.

Similar to the case of FIG. 15A, since the compression section 201 compresses the image data, the image pickup element 100 can more effectively utilize a memory area of the memory section 193. In addition, using the image pickup element 100, it is possible to improve utilization efficiency of a memory bus and input/output coded data from/to the memory section 193 at a higher speed without increasing a cost.

Naturally, the circuit formed in the semiconductor substrate 191 may have an arbitrary configuration, and other circuit elements other than the memory section 193 may be formed. That is, buses other than the memory bus may be used as the bus between the circuit configuration of the semiconductor substrate 102 and the circuit configuration of the semiconductor substrate 191 for transmitting the coded data.

In the example of FIG. 17, both the compression section 201 and the decompression section 202 may be formed in the semiconductor substrate 102 (that is, formed in the same semiconductor substrate). However, without limiting thereto, for example, the compression section 201 and the decompression section 202 may be formed in different semiconductor substrates.

For example, the compression section 201 may be provided in one end of the bus that connects the circuits of a pair of semiconductor substrates, and the decompression section 202 may be provided in the other end. In this configuration, the image data may be compressed and transmitted via a bus between semiconductor substrates susceptible to a bandwidth limitation.

Naturally, the image pickup element 100 may have a stack structure having four or more layers of the semiconductor substrates.

Figure 18:
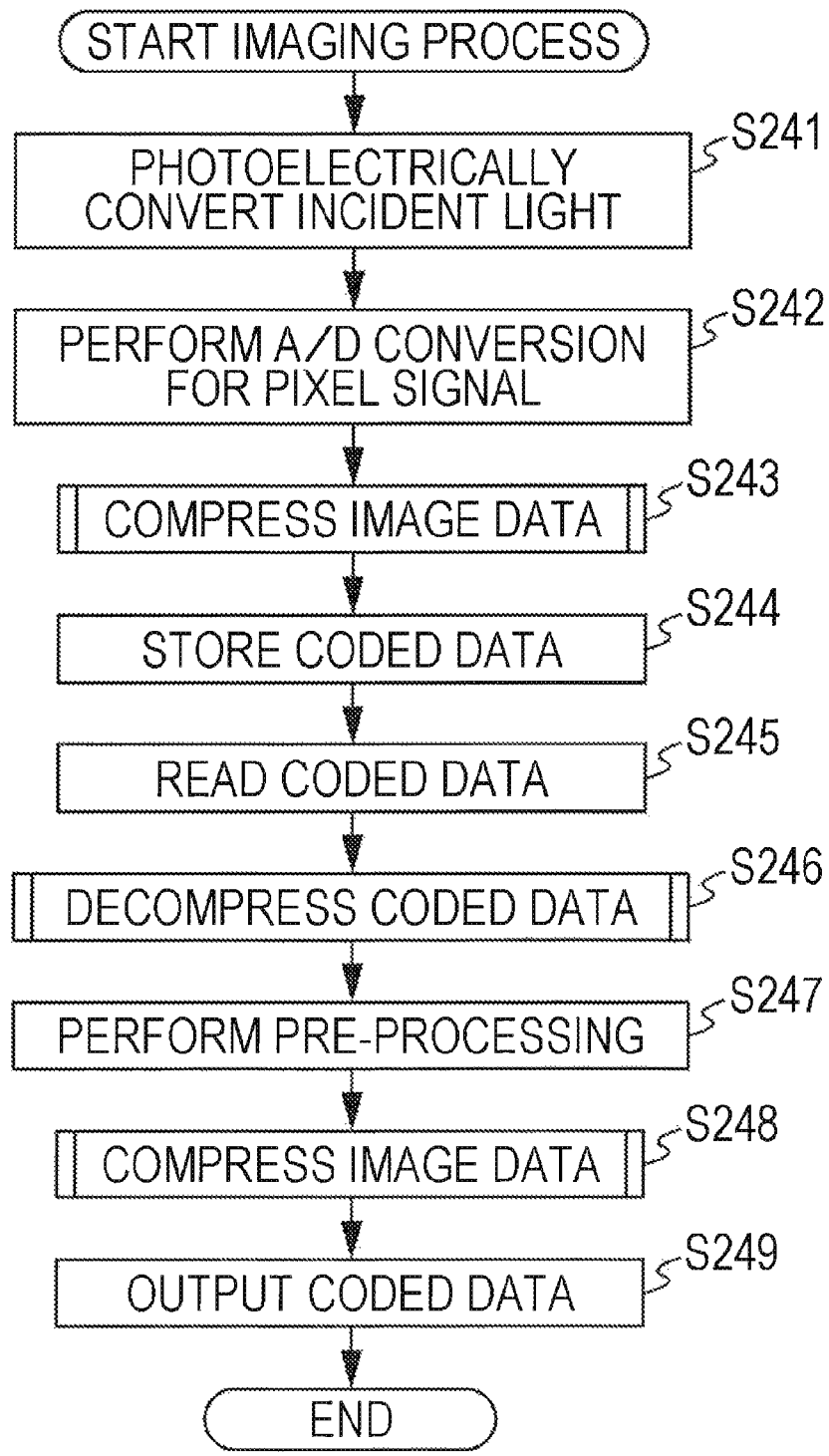
FIG. 18 is a flowchart illustrating still another exemplary imaging process flow.

Next, an exemplary flow of the imaging process executed by the image pickup element 100 of FIG. 17 will be described with reference to the flowchart of FIG. 18. This imaging process may be executed when the image pickup element 100 photographically captures an object to obtain image data of the object image.

Figure 16:
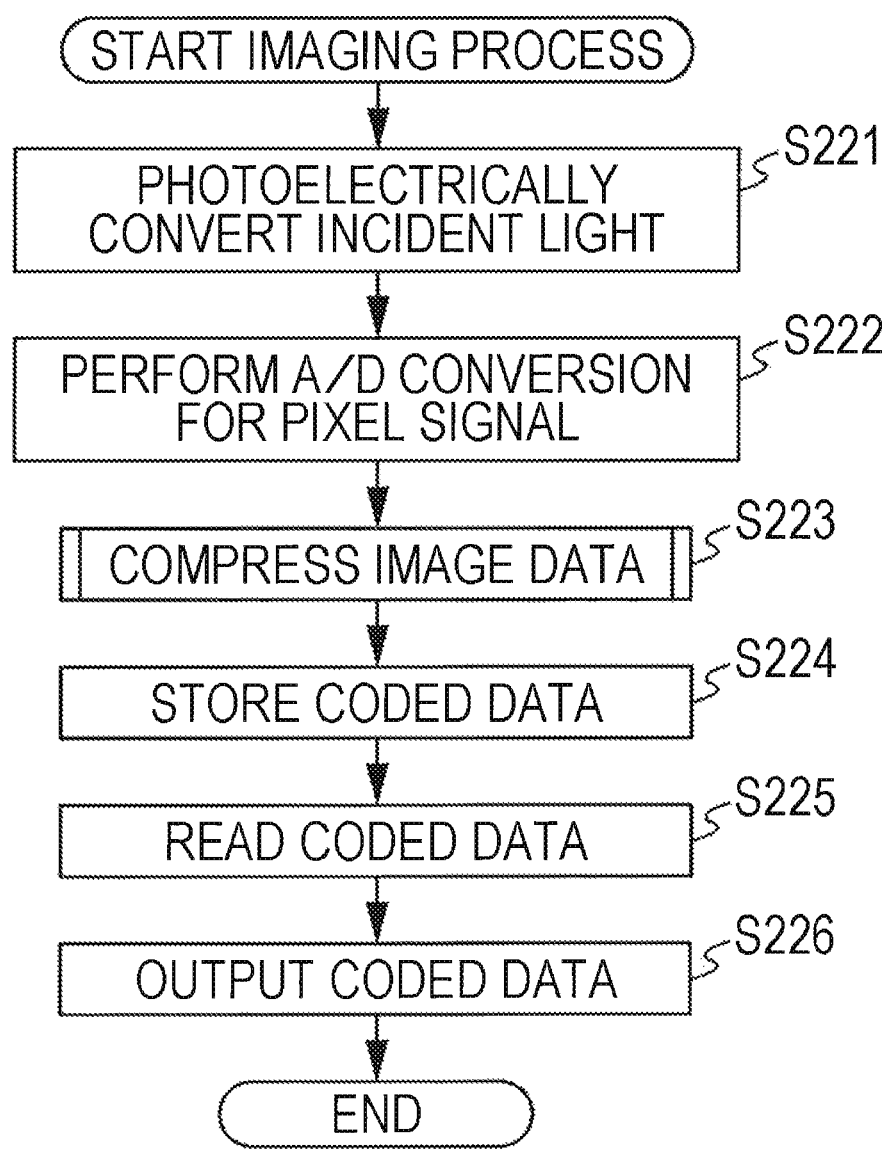
FIG. 16 is a flowchart illustrating still another exemplary imaging process flow.

As the imaging process starts, the processing of steps S241 and S242 is executed as in the processing of steps S221 and S222, respectively, of FIG. 16. In step S243, the compression section 201 compresses the imaging device obtained through the analog-digital conversion in the processing of step S242. This compression method may be set arbitrarily. For example, the compression section 201 may perform this compression process as described above in conjunction with the flowchart of FIG. 5A or 5B.

In step S244, the memory controller 192 causes the memory section 193 to store the coded data obtained through the processing of step S243. In step S245, the memory controller 192 reads the coded data stored in the memory section 193.

In step S246, the decompression section 202 decompresses the coded data read from the memory section 193 through the processing of step S245 using a method matching the compression process of step S243. This decompression method may be arbitrarily set if it corresponds to the compression process of step S243. For example, the decompression section 202 may perform this decompression process as described above in conjunction with the flowchart of FIG. 7A or 7B.

The processing of steps S247 to S249 is executed as in the processing of steps S183 to S185, respectively, of FIG. 10.

By executing each processing described above, it is possible to execute pre-processing, for example, at an arbitrary timing using the image pickup element 100.

2. Second Embodiment

Imaging Device

Figure 19:
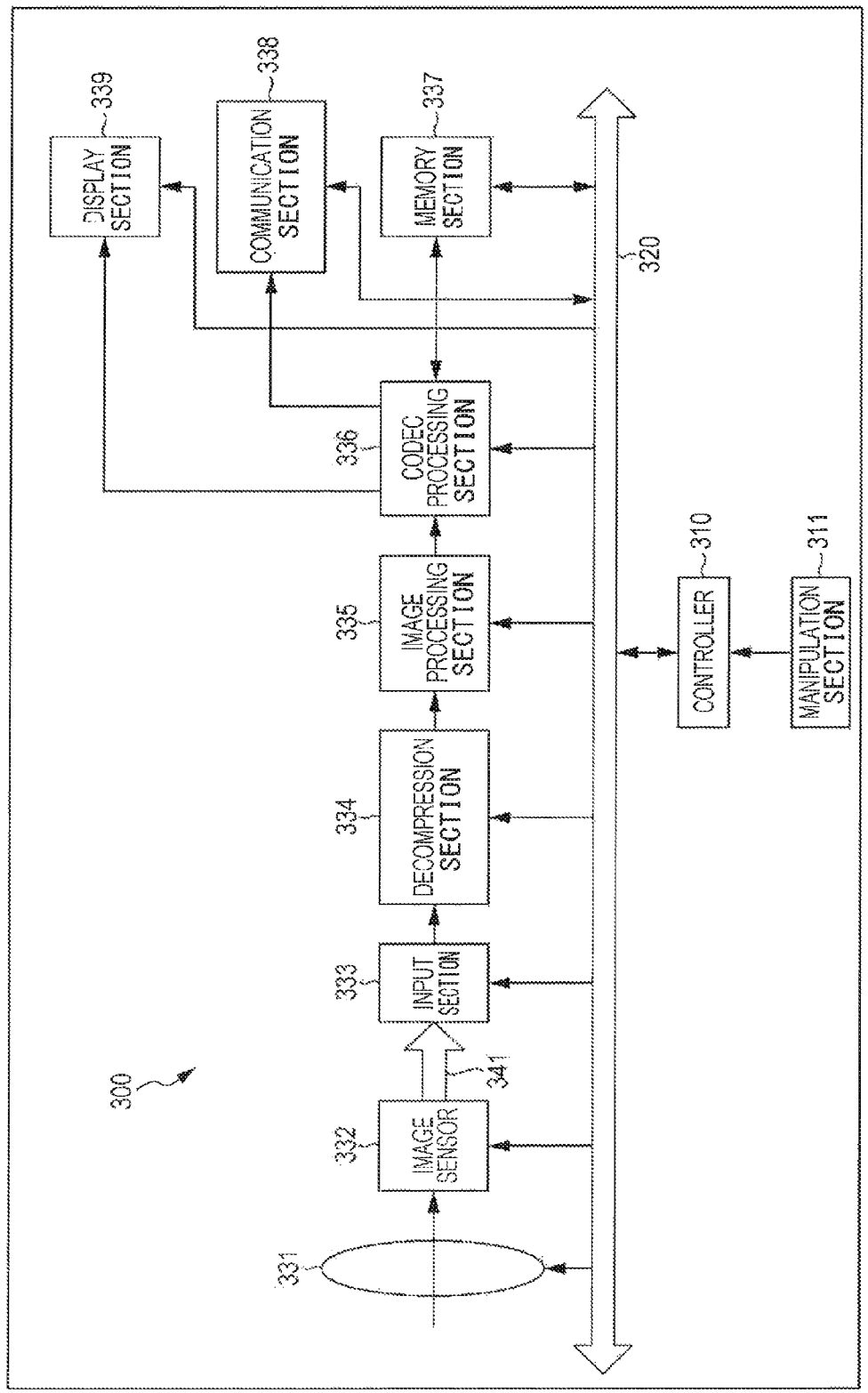
FIG. 19 is a diagram illustrating a main configuration example of the imaging device.

FIG. 19 is a block diagram illustrating a main configuration example of an imaging device. The imaging device 300 of FIG. 19 is a device that photographically captures an object and outputs the object image as an electric signal.

As illustrated in FIG. 19, the imaging device 300 may include a controller 310 and a manipulation section 311. In addition, the imaging device 300 may include an optical section 331, an image sensor 332, an input section 333, a decompression section 334, an image processing section 335, a codec processing section 336, a recording section 337, a communication section 338, and a display section 339.

The controller 310 may be connected to each of the optical section 331, the image sensor 332, the input section 333, the decompression section 334, the image processing section 335, the codec processing section 336, the recording section 337, the communication section 338, and the display section 339 via a bus 320 to control the entire processing in the imaging device 300 by controlling operation of each section.

The manipulation section 311 may include, for example, a jog dial (trademark), a key button, a touch panel, or the like. The manipulation section 311 receives a manipulation input from a user and supplies a signal (instruction) corresponding to that manipulation input to the controller 310. The controller 310 controls each section of the imaging device 300 in response to the instruction.

The optical section 331 may include a lens that adjusts a focal point of the object to focus light from the focal point position, an aperture stop that adjusts exposure, and a shutter that controls a capturing timing. The optical section 331 transmits the light (incident light) from an object and supplies the light to the image sensor 332.

The image sensor 332 obtains image data by photoelectrically converting the incident light. The image pickup element 100 described above in the first embodiment is used as the image sensor 332. As a result, using the imaging device 300, it is possible to suppress an influence of the band limiting of the bus 121. Without increasing a cost (without increasing the number of I/O cells or I/O pins of the output section 114), it is possible to improve imaging performance. For example, it is possible to increase resolution of an image and a processing speed from capturing of a still image to recording. In addition, it is possible to increase the number of continuous shots, a continuous shooting speed, and a frame rate of a moving picture. Furthermore, it is possible to obtain both a still image and a moving picture at the same time.

That is, the image sensor 332 compresses the obtained image data and outputs the image data as coded data to the outside of the image sensor 332 as described above in the first embodiment. The coded data output from the image sensor 332 is supplied to the input section 333 via the bus 341.

The input section 333 receives the coded data transmitted via the bus 341. The input section 333 supplies the received coded data to the decompression section 334.

Similar to the decompression section 132 described above in the first embodiment, the decompression section 334 decompress the coded data supplied from the input section 333 using a decompression method matching the compression method of the image sensor 332 to recover the image data. The decompression section 334 supplies the recovered image data to the image processing section 335.

The image processing section 335 performs predetermined image processing for the image data supplied from the decompression section 334. Any method may be used to perform this image processing. For example, the image processing section 335 may perform demosaicing or high technology defect pixel correction for the supplied image data (raw data). For example, details of the image processing executed by the image processing section 335 may be designated by the controller 310 based on a user's instruction input through the manipulation section 311.

The image processing section 335 supplies the image data subjected to image processing to the codec processing section 336.

The codec processing section 336 encodes the image data or decodes the coded data as necessary. For example, the codec processing section 336 encodes the image data supplied from the image processing section 335 based on a predetermined coding scheme suitable for encoding the image data, supplies the obtained coded data to the recording section 337, and records the coded data. In this codec processing section 336, a limitation on the compression scheme is easier than that of the inside of the image pickup element 100. Therefore, more various compression schemes can be applied. For example, high technology compression schemes such as a joint photographic experts group (JPEG), JPEG2000, moving picture experts group (MPEG), advanced video coding (AVC), high efficiency video coding (HEVC) may be employed.

For example, the codec processing section 336 similarly encodes the image data supplied from the image processing section 335 and outputs the obtained coded data to the outside of the imaging device 300 through the communication section 338. In addition, the codec processing section 336 reads the coded data recorded in the recording section and outputs the coded data to the outside of the imaging device 300 through the communication section 338.

For example, the codec processing section 336 reads the coded data recorded in the recording section and decodes the coded data using a decoding method matching the coding method used to create the coded data to recover the image data. The codec processing section 336 supplies the obtained image data to the display section 339 to display the image of the image data. In addition, the codec processing section 336 supplies the image data supplied from the image processing section 335 to the display section 339 to display the image of the image data.

The codec processing section 336 selects any one of the various processing, for example, depending on control of the controller 310 and appropriately performs necessary processing.

The recording section 337 has any recording medium such as a hard disk or flash memory and records the coded data supplied from the codec processing section 336 in the recording medium. Any recording medium can be used. For example, a removable medium detachably installed in the imaging device 300 may be used. In this case, the recording section 337 may include a drive (not illustrated) accessible to the installed removable medium and a removable medium installed in the drive. The recording section 337 may include a plurality of recording media or a plurality of types of recording media.

The communication section 338 is a communication interface that performs communication with an external device of the imaging device 300 using a predetermined communication scheme. This communication may be performed using any method such as a wired or wireless communication method. The communication section 338 transmits, for example, the coded data supplied from the codec processing section to other devices.

The display section 339 has any display device such as a liquid crystal display (LCD) and displays the image of the image data supplied from the codec processing section 336.

As described above, the technology described in the first embodiment is applied to the image sensor 332. That is, the image pickup element 100 is used as the image sensor 332. Therefore, using the image sensor 332, it is possible to suppress an influence of the band limiting of the bus 341. In addition, it is possible to improve imaging performance without increasing a cost. Therefore, using the imaging device 300, it is possible to obtain a moving picture or a still image having a higher quality by capturing an image using the image sensor 332.

<Flow of Imaging Process>

Figure 20:
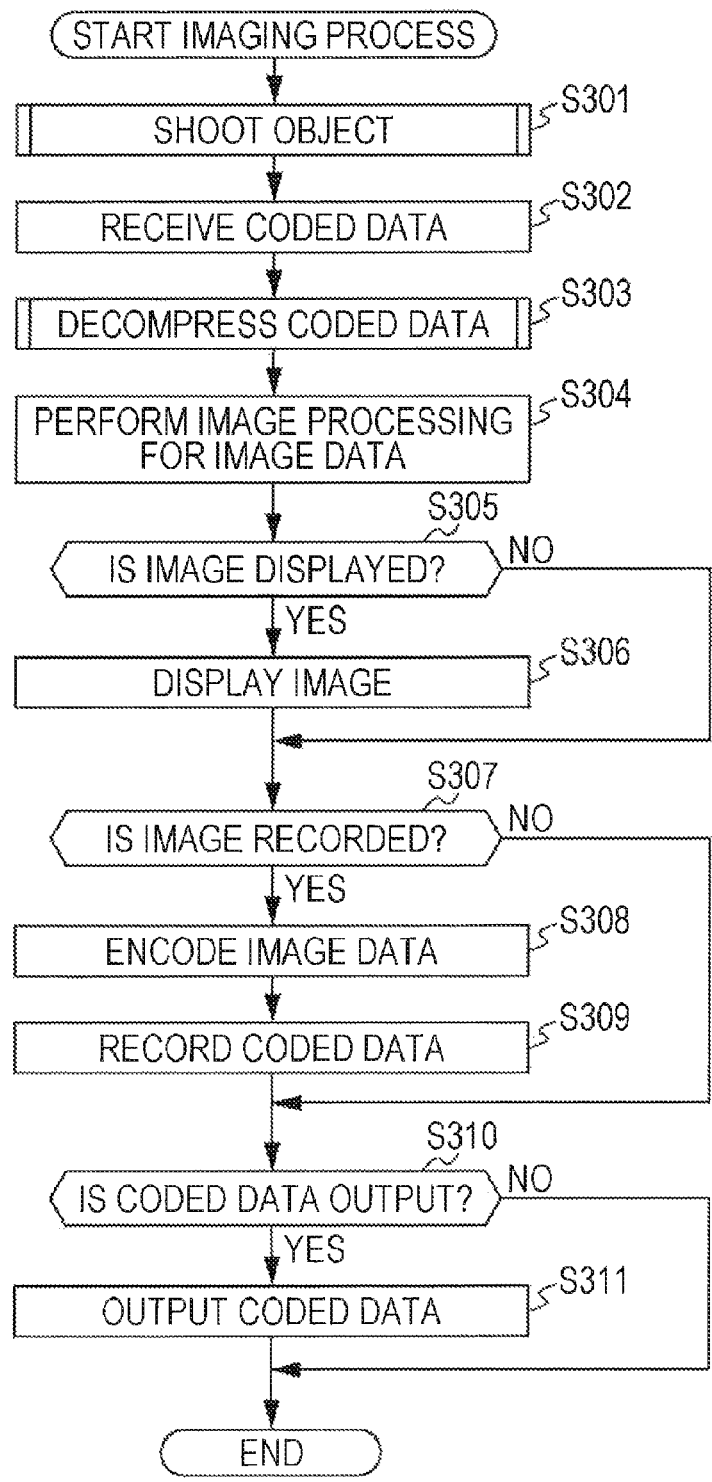
FIG. 20 is a flowchart illustrating still another exemplary imaging process flow.

Next, an exemplary flow of an imaging process executed by the aforementioned imaging device 300 will be described with reference to the flowchart of FIG. 20.

For example, as a user manipulates a shutter button of the manipulation section 311 of the imaging device 300 and the like, an imaging process for photographically capturing an object to obtain a photographic image of the object.

As the imaging process starts, in step S301, the image sensor 332 performs an imaging process using the method described above in conjunction with the flowchart of FIG. 4, 10, 13, 16, or 18 to capture an image. Coded data obtained by compressing the image data of the object image is output to the bus 341. Since this imaging process using the image sensor 332 has been described in the first embodiment, description thereof will not be repeated.

In step S302, the input section 333 receives the coded data transmitted via the bus 341. In step S303, the decompression section 334 decompresses the coded data received through the processing of step S302, for example, using the method described above in conjunction with the flowchart of FIG. 7A or 7B. Since this decompression process has been described above in the first embodiment, description thereof will not be repeated.

In step S304, the image processing section 335 performs image processing for the image data obtained through the processing of step S334.

In step S305, the controller 310 determines whether or not the image of the image data is displayed. If it is determined that the image is displayed, the process advances to step S306. In step S306, the display section 339 displays the image of the image data subjected to the image processing in step S304.

As the processing of step S306 is terminated, the process advances to step S307. In addition, if it is determined that the image is not displayed in step S305, the process advances to step S307.

In step S307, the controller 310 determines whether or not the image data is recorded. If it is determined that the image data is recorded, the process advances to step S308. In step S308, the codec processing section 336 encodes the image data subjected to the image processing in step S304. In step S309, the recording section 337 records the coded data obtained through the processing of step S308.

As the processing of step S309 is terminated, the process advances to step S310. In addition, if it is determined that the image data is not recorded in step S307, the process advances to step S310.

In step S310, the controller 310 determines whether or not the image data is output to the outside of the imaging device 300. If it is determined that the image data is output to the outside of the imaging device 300, the process advances to step S311. In step S311, the communication section 338 transmits the coded data obtained from the codec processing section 336 to other devices using a predetermined communication scheme. As the processing of step S311 is terminated, the imaging process is terminated.

If it is determined that the image data is not output in step S310, the imaging process is terminated.

By performing the imaging process as described above, the technology described above in the first embodiment can be applied to the image sensor 332 in the imaging device 300. That is, using the image sensor 332, it is possible to suppress an influence of the band limiting of the bus 341. In addition, it is possible to improve imaging performance without increasing a cost. Using the imaging device 300, it is possible to obtain a moving picture or a still image having a higher quality by photographically capturing an object using such an image sensor 332.

<Processing of Moving Picture and Still Image>

By applying the present technology of the first embodiment to the image sensor 332, the imaging device 300 can capture a still image while a moving picture is taken.

Figure 21:
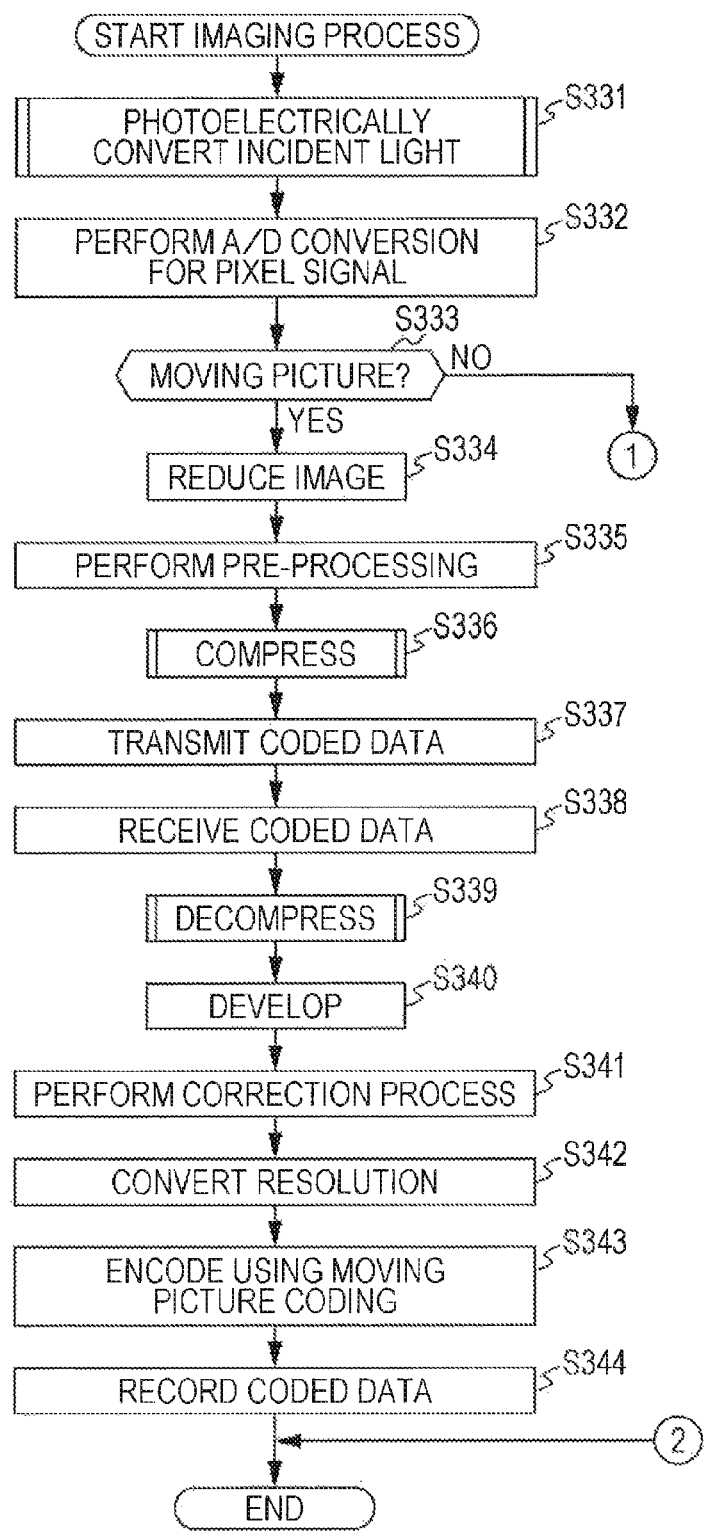
FIG. 21 is a flowchart illustrating still another exemplary imaging process flow.

An exemplary flow of the imaging process in that case will be described with reference to the flowcharts of FIGS. 21 and 22. It is assumed that the image sensor 332 has the configuration illustrated in FIG. 12. Here, a process of obtaining an object image by capturing an image and recording the obtained image data in the recording section 337 will be described as an imaging process.

As the imaging process starts, the light-receiving section 111 of the image sensor 332 (image pickup element 100) photoelectrically converts the incident light in step S331.

In step S332, the A/D conversion section 112 performs analog-digital conversion for the pixel signal of each unit pixel obtained in step S331 to obtain digital image data.

In step S333, the controller 171 determines whether or not the image of the image data obtained in step S332 is a moving picture. If it is determined that the image is a moving picture, the process advances to step S334.

In step S334, the image reduction section 172 reduces the image of the image data. In step S335, the pre-processing section 160 performs pre-processing. In step S336, the compression section 113 compresses the image data subjected to the pre-processing. Since details of this compression process have been described above in conjunction with the flowchart of FIG. 5A or 5B, description thereof will not be repeated.

In step S337, the output section 114 transmits the coded data obtained through the processing of step S336 to the input section 333 via the bus 341.

In step S338, the input section 333 receives the coded data transmitted via the bus 341. In step S339, the decompression section 334 decompresses the coded data received through the processing of step S338. Since details of this decompression process have been described above in conjunction with the flowchart of FIG. 7A or 7B, description thereof will not be repeated.

In step S340, the image processing section 335 performs demosaicing for the image data recovered through the processing of step S339 to develop an image. In step S341, the image processing section 335 performs a correction process for the image data. In step S342, the image processing section 335 converts resolution of the image of the image data.

In step S343, the codec processing section 336 encodes the image data using a moving picture coding scheme. In step S344, the recording section 337 records the coded data obtained through the processing of step S343.

As the processing of step S344 is terminated, the imaging process is terminated.

Figure 22:
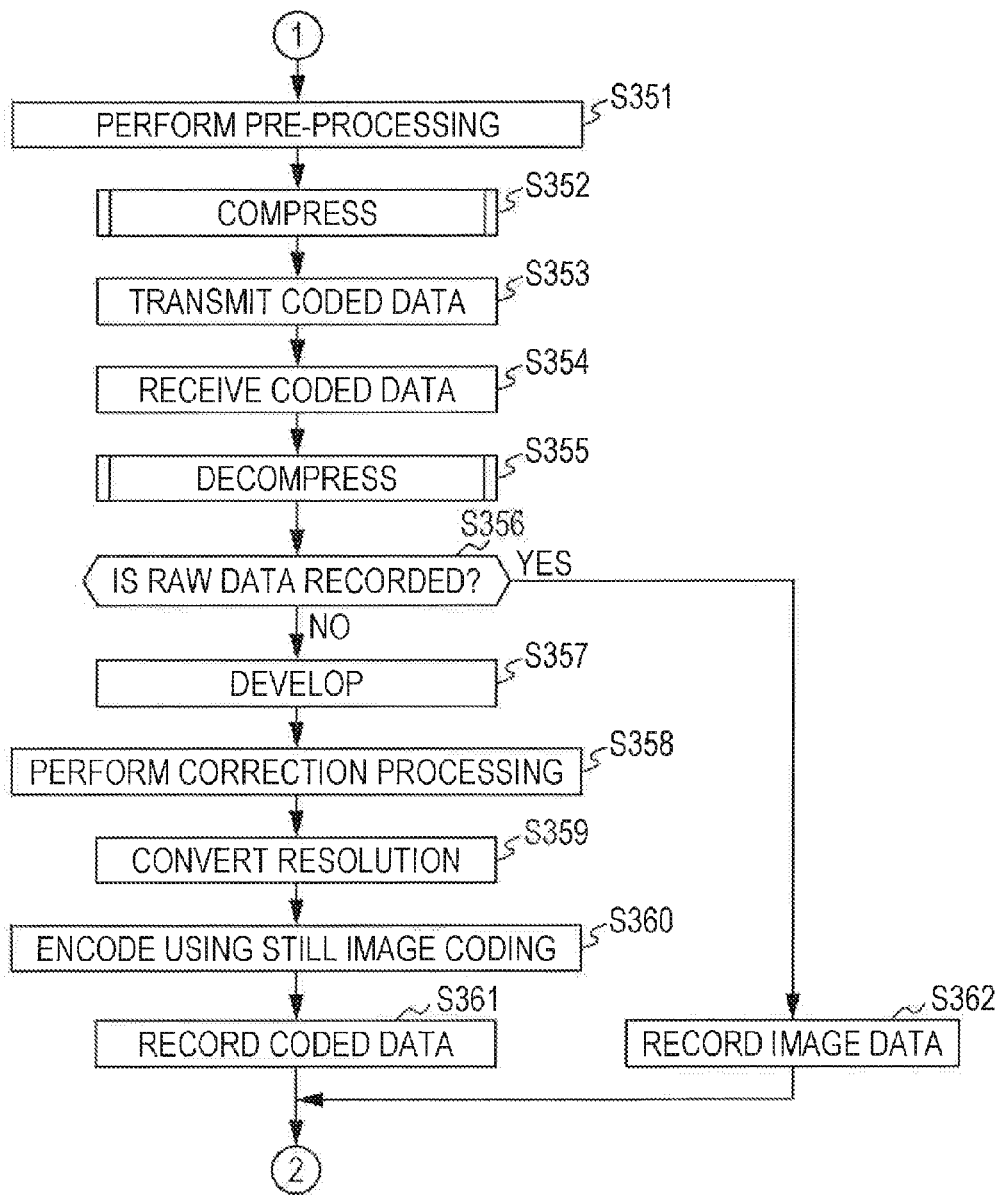
FIG. 22 is a flowchart illustrating still another exemplary imaging process flow connected to FIG. 21.

If it is determined that the image is a still image in step S333, the process advances to FIG. 22.

In step S351 of FIG. 22, the pre-processing section 160 performs pre-processing for the image data whose image size has not been reduced. In step S352, the compression section 113 compresses the image data subjected to the pre-processing. Since details of this compression process have been described in conjunction with the flowchart of FIG. 5A or 5B, description thereof will not be repeated.

In step S353, the output section 114 transmits the coded data obtained through the processing of step S352 to the input section 333 via the bus 341.

In step S354, the input section 333 receives the coded data transmitted via the bus 341. In step S355, the decompression section 334 decompresses the coded data received through the processing of step S338. Since details of this decompression process have been described in conjunction with the flowchart of FIG. 7A or 7B, description thereof will not be repeated.

In step S356, the controller 310 determines whether or not the image data is recorded as raw data. For example, if it is determined that the image data is recorded in a compressed state based on a user's instruction, the process advances to step S357.

In step S357, the image processing section 335 performs demosaicing for the image data recovered through the processing of step S355 to develop the image. In step S358, the image processing section 335 performs a correction process for the image data. In step S359, the image processing section 335 converts resolution of the image of the image data.

In step S360, the codec processing section 336 encodes the image data using a still image coding scheme. In step S361, the recording section 337 records the coded data obtained through the processing of step S360.

As the processing of step S361 is terminated the imaging process is terminated.

If it is determined that the image data is recorded as raw data in step S356, the process advances to step S362.

In step S362, the recording section 337 records the image data (raw data) recovered through the processing of step S355.

As the processing of step S362 is terminated, the image process is terminated.

By performing the imaging process as described above, it is possible to improve imaging performance using the imaging device 300 while degradation of an image quality of a still image is suppressed.

3. Third Embodiment

Codec Processing Section

A codec processing section 336 of FIG. 19 may have an encoder based on any coding scheme. For example, the codec processing section 336 may have a high efficiency Video Coding (HEVC)-based encoder. Hereinafter, description will be made for an example of the HEVC-based encoder of the codec processing section 336.

Figure 23:
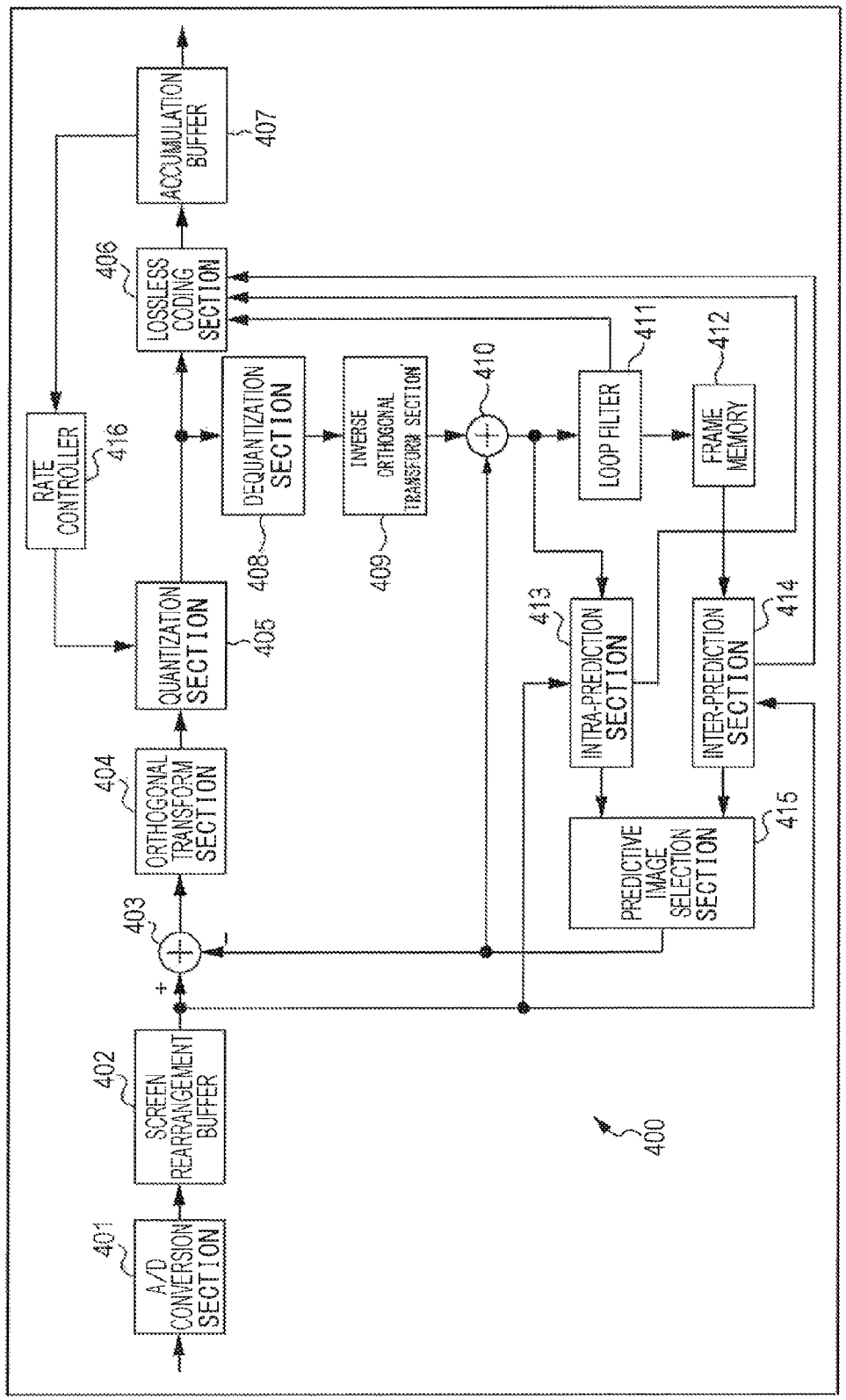
FIG. 23 is a block diagram illustrating a main configuration example of the coding section.

FIG. 23 is a block diagram illustrating an exemplary coding section of the codec processing section 336. The coding section 400 of FIG. 23 is an encoder provided in the codec processing section 336. For example, the codec processing section 336 encodes image data of a moving picture using a HEVC-based prediction process or a prediction process based on a scheme conforming to the HEVC, but is not limited thereto.

As illustrated in FIG. 23, the coding section 400 may include an A/D conversion section 401, a screen rearrangement buffer 402, a computation section 403, an orthogonal transform section 404, a quantization section 405, a lossless coding section 406, an accumulation buffer 407, a dequantization section 408, and an inverse orthogonal transform section 409. In addition, the coding section 400 may include a computation section 410, a loop filter 411, a frame memory 412, an intra-prediction section 413, an inter-prediction section 414, a predictive image selection section 415, and a rate control section 416.

The A/D conversion section 401 performs analog-digital conversion for the input image data and supplies the converted image data (digital data) to the screen rearrangement buffer 402 to store the image data. The screen rearrangement buffer 402 rearranges images of frames arranged in a stored display sequence depending on a group of pictures (GOP) into a frame sequence for coding and supplies the image obtained by rearranging the frame sequence to the computation section 403. In addition, the screen rearrangement buffer 402 also supplies the image obtained by rearranging the frame sequence to the intra-prediction section 413 and the inter-prediction section 414.

The computation section 403 subtracts, from the image read from the screen rearrangement buffer 402, a predictive image supplied from the intra-prediction section 413 or the inter-prediction section 414 through the predictive image selection section 415 and outputs difference information thereof to the orthogonal transform section 404. For example, in the case of an intra-coded image, the computation section 403 subtracts, from the image read from the screen rearrangement buffer 402, the predictive image supplied from the intra-prediction section 413. For example, in the case of an inter-coded image, the computation section 403 subtracts, from the image read from the screen rearrangement buffer 402, the predictive image supplied from the inter-prediction section 414.

The orthogonal transform section 404 performs orthogonal transform such as discrete cosine transform or Karhunen-Loeve transform for the difference information supplied from the computation section 403. The orthogonal transform section 404 supplies a transform coefficient thereof to the quantization section 405.

The quantization section 405 quantizes the transform coefficient supplied from the orthogonal transform section 404. The quantization section 405 performs quantization by setting a quantization parameter based on information on a target value of a code amount supplied from the rate control section 416. The quantization section 405 supplies the quantized transform coefficient to the lossless coding section 406.

The lossless coding section 406 encodes the transform coefficient quantized by the quantization section 405 using a predetermined coding scheme. Since the coefficient data is quantized under control of the rate control section 416, this code amount becomes the target value set by the rate control section 416 (or approximate to the target value).

In addition, the lossless coding section 406 obtains information representing an intra-prediction mode and the like from the intra-prediction section 413 and obtains information representing an inter-prediction mode, difference motion vector information, or the like from the inter-prediction section 414.

The lossless coding section 406 encodes such various information using any coding scheme and incorporates (multiplexes) the encoded information into a part of header information of the coded data (hereinafter, also referred to as a coded stream). The lossless coding section 406 supplies the obtained coded data to the accumulation buffer 407 to accumulate the coded data.

The coding scheme of the lossless coding section 406 may include, for example, a variable length coding, an arithmetic coding, and the like. As the variable length coding, for example, a context-adaptive variable length coding (CAVLC) defined in the H.264/AVC standard may be employed. As the arithmetic coding, for example, a context-adaptive binary arithmetic coding (CABAC) may be employed.

The accumulation buffer 407 temporarily stores the coded data supplied from the lossless coding section 406. The accumulation buffer 407 outputs the stored coded data to the outside of the coding section 400 at a predetermined timing. That is, the accumulation buffer 407 also serves as a transmission section that transmits the coded data.

The transform coefficient quantized by the quantization section 405 is also supplied to the dequantization section 408. The dequantization section 408 dequantizes the quantized transform coefficient using a method matching the quantization of the quantization section 405. The dequantization section 408 supplies the obtained transform coefficient to the inverse orthogonal transform section 409.

The inverse orthogonal transform section 409 performs inverse orthogonal transform for the transform coefficient supplied from the dequantization section 408 using a method matching the orthogonal transform process of the orthogonal transform section 404. The information subjected to the inverse orthogonal transform (recovered difference information) is supplied to the computation section 410.

The computation section 410 adds the predictive image from the intra-prediction section 413 or the inter-prediction section 414 to the recovered difference information which is a result of the inverse orthogonal transform supplied from the inverse orthogonal transform section 409 through the predictive image selection section 415 to obtain an locally rearranged image (hereinafter, referred to as an rearranged image). The rearranged image is supplied to the loop filter 411 or the intra-prediction section 413.

The loop filter 411 may include a deblock filter or an adaptive loop filter and appropriately performs a filtering process for the rearranged image supplied from the computation section 410. For example, the loop filter 411 performs a deblock filtering process for the rearranged image to remove a block noise of the rearranged image. For example, the loop filter 411 performs loop filtering using a Wiener filter for the result of the deblock filtering (the rearranged image obtained by removing a block noise) to improve an image quality.

In addition, the loop filter 411 may perform any other filtering process for the rearranged image. In addition, the loop filter 411 may supply information on a filter coefficient and the like used in the filtering process to the lossless coding section 406 as necessary and encode the information.

The loop filter 411 supplies the result of the filtering process (hereinafter, referred to as a decoded image) to the frame memory 412.

The frame memory 412 stores the supplied decoded image and supplies the stored decoded image to the inter-prediction section 414 as a reference image at a predetermined timing.

The intra-prediction section 413 performs intra-prediction for generating a predictive image using a pixel value in the processing target picture, which is the rearranged image supplied from the computation section 410 as a reference image. The intra-prediction section 413 performs the intra-prediction using a plurality of intra-prediction modes prepared in advance.

The intra-prediction section 413 creates a predictive image in overall candidate intra-prediction modes and evaluates cost function values of each predictive image using the input image supplied from the screen rearrangement buffer 402 to select an optimal mode. As an optimal intra-prediction section mode is selected, the intra-prediction section 413 supplies the predictive image created in the optimal mode to the predictive image selection section 415.

As described above, the intra-prediction section 413 appropriately supplies intra-prediction mode information representing the employed intra-prediction mode to the lossless coding section 406 to encode the intra-prediction mode information.

The inter-prediction section 414 performs an inter-prediction process (motion prediction process and compensation process) using the input image supplied from the screen rearrangement buffer 402 and the reference image supplied from the frame memory 412. More specifically, the inter-prediction section 414 performs a motion compensation process as an inter-prediction process depending on the motion vector detected by performing motion prediction to create a predictive image (inter-prediction image information). The inter-prediction section 414 performs such inter-prediction using a plurality of inter-prediction modes prepared in advance.

The inter-prediction section 414 creates a predictive image in overall candidate inter-prediction modes. The inter-prediction section 414 evaluates cost function values of each predictive image using the input image supplied from the screen rearrangement buffer 402, information on the created difference motion vector, and the like to select an optimal mode. As an optimal inter-prediction section mode is selected, the inter-prediction section 414 supplies the predictive image created in the optimal mode to the predictive image selection section 415.

The inter-prediction section 414 supplies the lossless coding section 406 with information representing the employed inter-prediction mode, information necessary to perform the processing in that inter-prediction mode when the coded data is decoded, and the like to encode such information. The necessary information may include, for example, information on the created difference motion vector, a flag indicating an index of the prediction motion vector as predictive motion vector information, and the like.

The predictive image selection section 415 selects a supply source of the predictive image that supplies the predictive image to the computation section 403 or 410. For example, in the case of the intra-coding, the predictive image selection section 415 selects the intra-prediction section 413 as a supply source of the predictive image and supplies the predictive image supplied from the intra-prediction section 413 to the computation section 403 or 410. For example, in the case of the inter-coding, the predictive image selection section 415 selects the inter-prediction section 414 as a supply source of the predictive image and supplies the predictive image supplied from the inter-prediction section 414 to the computation section 403 or 410.

The rate control section 416 controls a quantization rate of the quantization section 405 based on the code amount of the coded data accumulated in the accumulation buffer 407 in order to prevent an overflow or an underflow.

<Coding Unit>

In the advanced video coding (AVC) scheme, a hierarchical structure based on macroblocks and sub-macroblocks is defined. However, the macroblock having a size of 16 pixels×16 pixels is not optimal to a large picture frame called an ultra-high definition (UHD), having a size of 4000 pixels×2000 pixels, employed as the next-generation coding scheme.

Figure 24:
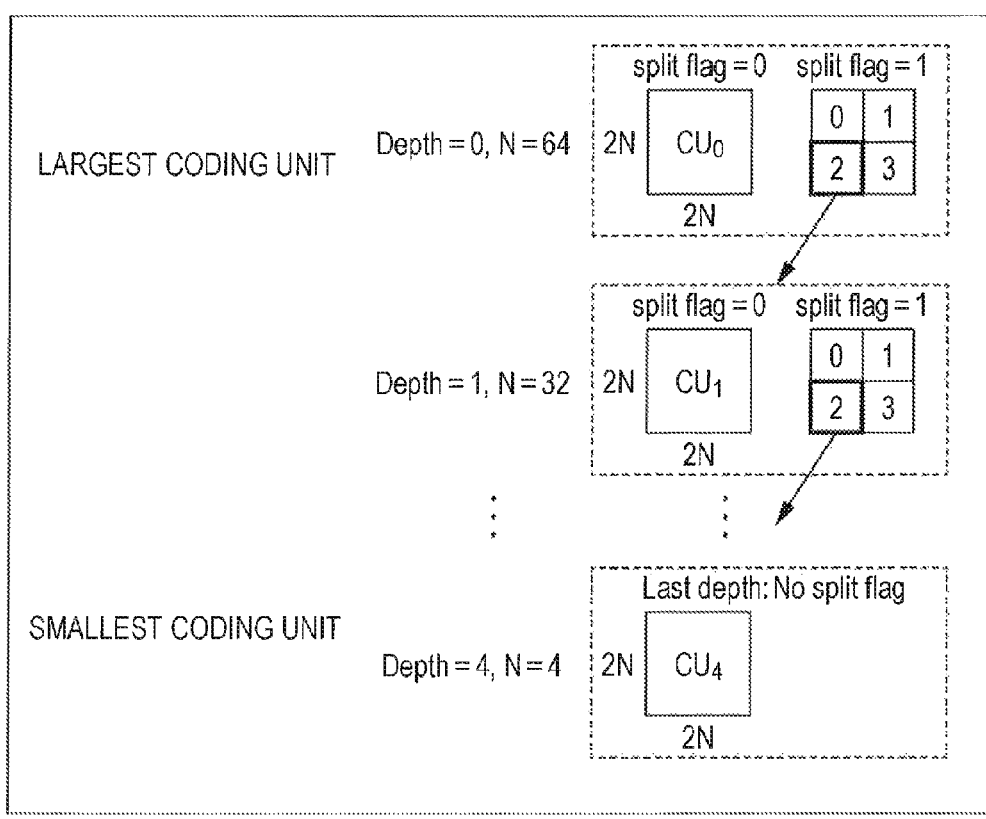
FIG. 24 is a diagram illustrating an exemplary configuration of a coding unit.

In this regard, in the HEVC scheme, a coding unit (CU) is defined as illustrated in FIG. 24.

The CU, also called a coding tree block CTB, is a partial area of a picture-based image, corresponding to a macroblock in the AVC scheme. While the macroblock of the AVC scheme is fixed to a size of 16 pixels×16 pixels, a size of the CU is not limited, but is designated by the image compression information in each sequence.

For example, the maximum size (largest coding unit (LCU)) and the minimum CU size (smallest coding unit (SCU)) of the CU are defined in a sequence parameter set (SPS) included in the output coded data.

Within a range of each LCU, the CU can be divided into a smaller size by setting split-flag=1 as long as it is not smaller than the size of the SCU. In the example of FIG. 24, the size of LCU is set to 128, and the maximum layer depth is set to 5. The CU having a size of 2N×2N is divided into lower layer CUs having a size of N×N when the value of "split_flag" is 1.

Furthermore, the CU is divided into a prediction unit (PU) which is an area (partial area of the picture-based image) serving as a processing unit of intra-prediction or inter-prediction. The CU is also divided into a transform unit (TU) which is an area (partial area of the picture-based image) serving as an orthogonal transform processing unit. Currently, according to the HEVC scheme, it is possible to use an orthogonal transform size of 4×4, 8×8, 16×16, and 32×32.

In the coding scheme such as the HEVC scheme, in which the CU is defined, and various processes are performed by using the CU as a unit, it can be conceived that the macroblock in the AVC scheme corresponds to the LCU, and the block (sub-block) corresponds to the CU. In addition, it can be conceived that the motion compensation block in the AVC scheme corresponds to the PU. However, since the CU has a hierarchical structure, the size of the highest layer LCU is typically set to be larger than that of the macroblock of the AVC scheme. For example, a size of 128×128 may be set.

<Decoding Section>

Figure 25:
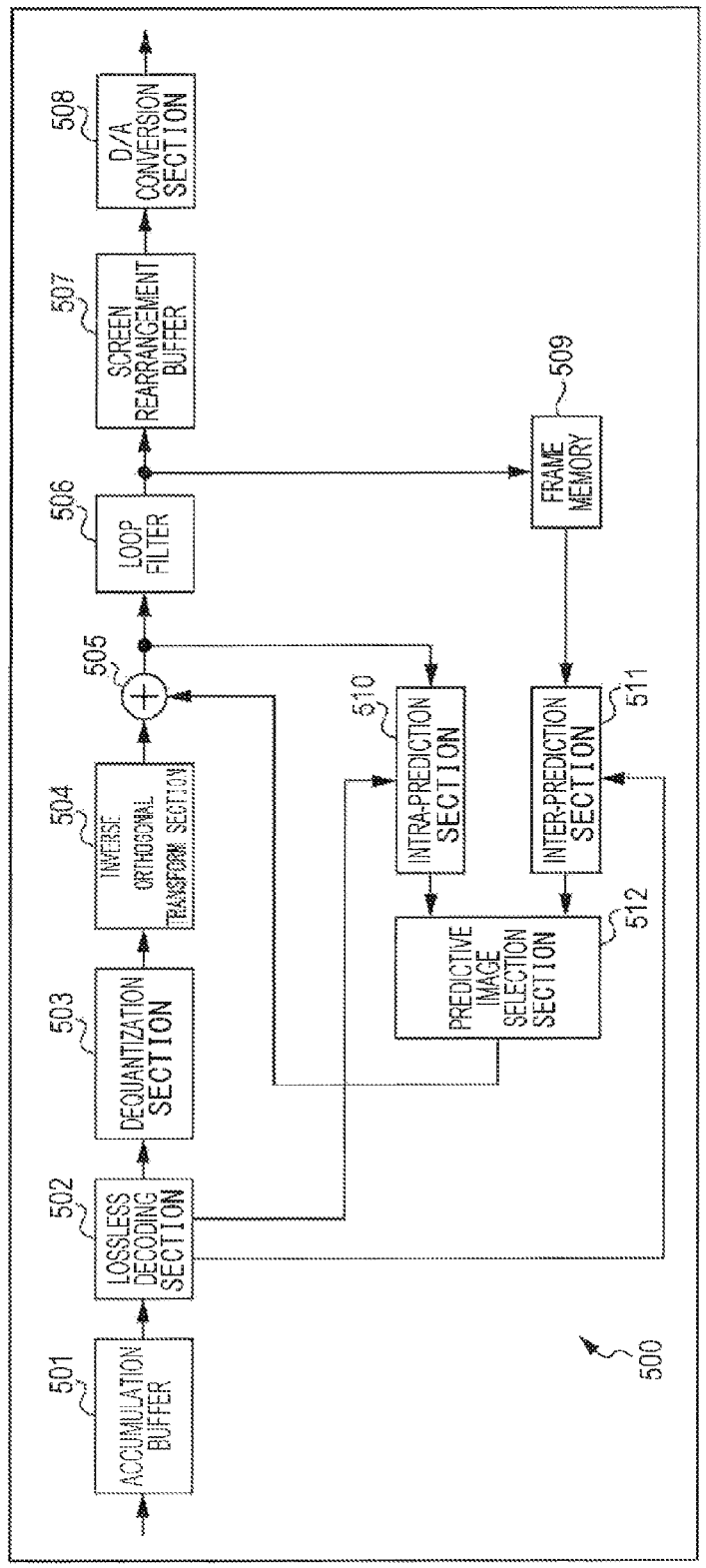
FIG. 25 is a block diagram illustrating a main configuration example of a decoding section.

Next, decoding in the HEVC scheme will be described. FIG. 25 is a main configuration example of the decoder corresponding to the coding section 400 of FIG. 23.

The decoding section 500 of FIG. 25 is a decoding section provided in the codec processing section 336 and corresponds to the coding section 400 of FIG. 23. That is, the decoding section 500 decodes the coded data created by the coding section 400 in the HEVC scheme.

As illustrated in FIG. 25, the decoding section 500 may include an accumulation buffer 501, a lossless decoding section 502, a dequantization section 503, an inverse orthogonal transform section 504, a computation section 505, a loop filter 506, a screen rearrangement buffer 507, and a D/A conversion section 508. In addition, the decoding section 500 may include a frame memory 509, an intra-prediction section 510, an inter-prediction section 511, and a predictive image selection section 512.

The accumulation buffer 501 is also a receiving section that receives the transmitted coded data. The accumulation buffer 501 receives the transmitted coded data, accumulates the received coded data, and supplies the coded data to the lossless decoding section 502 at a predetermined timing. Information necessary in the decoding, such as prediction mode information, is added to the coded data. The lossless decoding section 502 decodes the information encoded by the lossless coding section 406 of FIG. 23 and supplied from the accumulation buffer 501 using the HEVC scheme. The lossless decoding section 502 supplies the quantized coefficient data of the difference image obtained through the decoding to the dequantization section 503.

The lossless decoding section 502 determines which of the intra-prediction or the inter-prediction is selected as the optimal prediction mode and supplies information on the optimal prediction to the intra-prediction section 510 or the inter-prediction section 511 corresponding to the selected mode. That is, for example, in a case where the intra-prediction mode is selected as an optimal prediction mode in the coding section 400, information on the optimal prediction mode is supplied to the intra-prediction section 510. For example, in a case where the inter-prediction mode is selected as an optimal prediction mode in the coding section 400, information on the optimal prediction mode is supplied to the inter-prediction section 511.

In addition, the lossless decoding section 502 supplies the dequantization section 503 with information necessary in dequantization such as a quantization matrix or a quantization parameter.

The dequantization section 503 dequantizes the quantized coefficient data obtained through decoding by the lossless decoding section 502 using a method matching the quantization method of the quantization section 405 of FIG. 23. The dequantization section 503 is a processing section similar to the dequantization section 408 of the coding section 400 of FIG. 23. That is, description for the dequantization section 503 may be similarly applied to the dequantization section 408. However, it may be necessary to appropriately modify input and output destinations of data depending on a device.

The dequantization section 503 supplies the obtained coefficient data to the inverse orthogonal transform section 504.

The inverse orthogonal transform section 504 performs inverse orthogonal transform for the orthogonal transform coefficient supplied from the dequantization section 503 using a method matching the orthogonal transform method of the orthogonal transform section 404 of FIG. 23 as necessary. In addition, the inverse orthogonal transform section 504 is a processing section similar to the inverse orthogonal transform section 409 of the coding section 400 of FIG. 23. That is, description for the inverse orthogonal transform section 504 may be similarly applied to the inverse orthogonal transform section 409. However, it may be necessary to appropriately modify input and output destinations of data depending on a device.

The inverse orthogonal transform section 504 obtains decoding residue data corresponding to the residue data before the orthogonal transform in the coding section 400 through the inverse orthogonal transform process. The decoding residue data obtained through the inverse orthogonal transform is supplied to the computation section 505. In addition, the computation section 505 is supplied with the predictive image from the intra-prediction section 510 or the inter-prediction section 511 through the predictive image selection section 512.

The computation section 505 adds the difference image and the predictive image to obtain a rearranged image corresponding to the image before the predictive image is subtracted by the computation section 403 of the coding section 400. The computation section 505 supplies the rearranged image to the loop filter 506 and the intra-prediction section 510.

The loop filter 506 appropriately performs a loop filtering process such as a deblock filtering process or an adaptive loop filtering process for the supplied rearranged image to create a decoded image. For example, the loop filter 506 performs a deblock filtering process for the rearranged image to remove a block noise. For example, the loop filter 506 performs a loop filtering process for the result of the deblock filtering process (rearranged image obtained by removing a block noise) using a Wiener filter to improve an image quality.

Any filtering process may be performed by the loop filter 506. Filtering processes other than those described above may also be performed. In addition, the loop filter 506 may perform the filtering process using a filtering coefficient supplied from the coding section 400 of FIG. 23.

The loop filter 506 supplies the decoded image as a result of the filtering process to the screen rearrangement buffer 507 and the frame memory 509.

The screen rearrangement buffer 507 rearranges images. That is, the frame sequence rearranged by the screen rearrangement buffer 402 of FIG. 23 for the coding sequence is rearranged into an original display sequence. The D/A conversion section 508 performs digital-analog conversion for the image supplied from the screen rearrangement buffer 507 and outputs the result to a display section (not illustrated) to display the result.

The frame memory 509 stores the supplied decoded image and supplies the stored decoded image to the inter-prediction section 511 as a reference image at a predetermined timing or in response to a request from the outside such as the inter-prediction section 511.

The intra-prediction section 510 is supplied with information representing the intra-prediction mode obtained by decoding the header information and the like from the lossless decoding section 502. The intra-prediction section 510 performs intra-prediction using the rearranged image obtained from the frame memory 509 in the intra-prediction mode used in the intra-prediction section 413 of FIG. 23 to create a predictive image. The intra-prediction section 510 supplies the created predictive image to the predictive image selection section 512.

The inter-prediction section 511 obtains the information obtained by decoding the header information (such as optimal prediction mode information and reference image information) from the lossless decoding section 502.

The inter-prediction section 511 performs inter-prediction using the reference image obtained from the frame memory 509 using the inter-prediction mode indicated by the optimal prediction mode obtained from the lossless decoding section 502 to create a predictive image.

The predictive image selection section 512 supplies the computation section 505 with the predictive image from the intra-prediction section 510 or the predictive image from the inter-prediction section 511. In addition, in the computation section 505, the predictive image created by using the motion vector and the decoding residue data (difference image information) from the inverse orthogonal transform section 504 are added to decode the original image. That is, the inter-prediction section 511, the lossless decoding section 502, the dequantization section 503, the inverse orthogonal transform section 504, and the computation section 505 also constitute a decoding section that decodes the coded data using a motion vector to create the original image.

The codec processing section 336 may include such a coding section 400 or such a decoding section 500.

<Flow of Coding Process>

Figure 26:
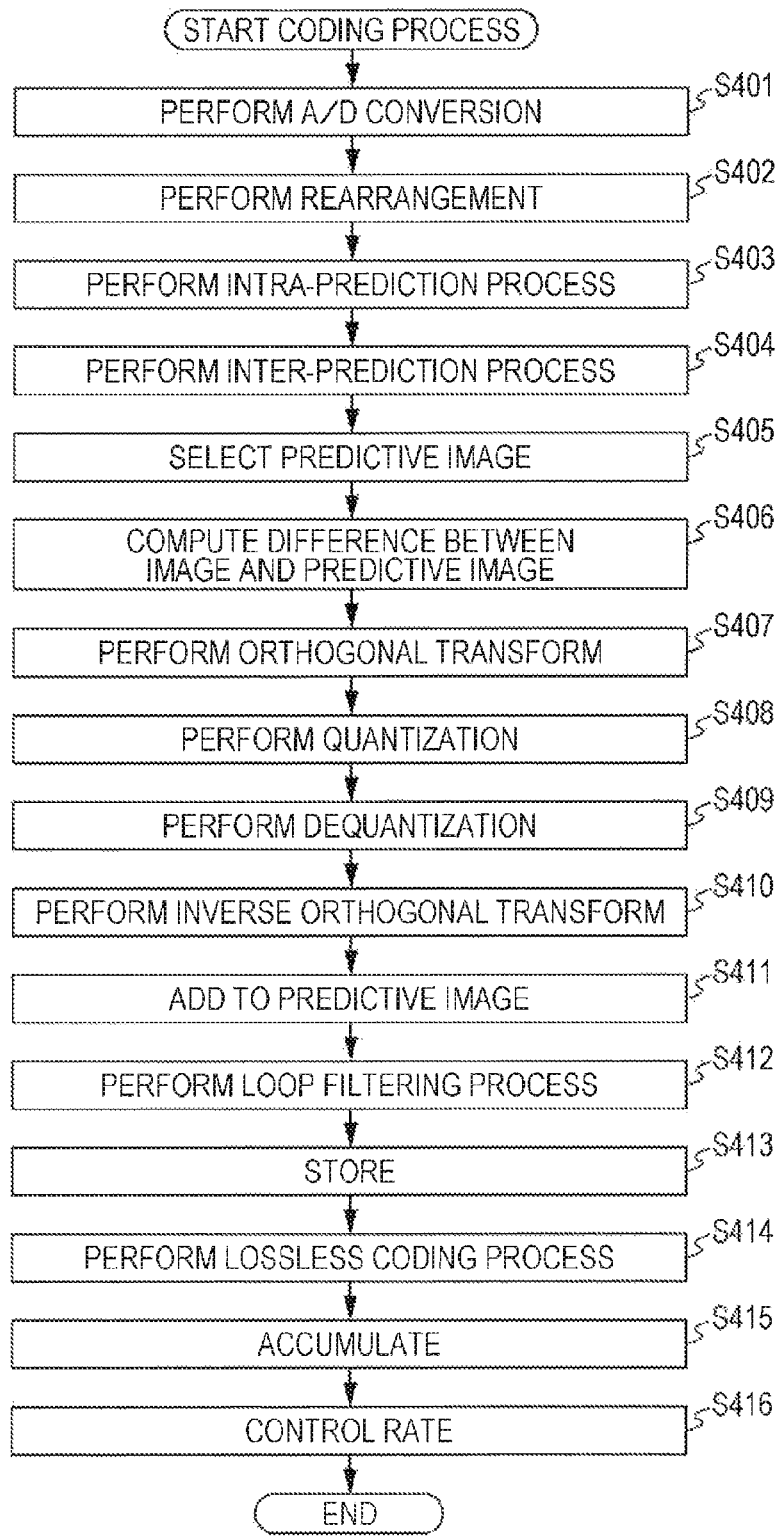
FIG. 26 is a flowchart illustrating an exemplary coding process flow.

Next, a flow of the coding process executed by the coding section 400 described above will be described with reference to the flowchart of FIG. 26.

In step S401, the A/D conversion section 401 performs analog-digital conversion for the input image. In step S402, the screen rearrangement buffer 402 stores the image subjected to the analog-digital conversion and rearranges each picture from a display sequence to a coding sequence. In step S403, the intra-prediction section 413 performs an intra-prediction process in the intra-prediction mode.

In step S404, the inter-prediction section 414 performs an inter-prediction process for motion prediction or motion compensation in the inter-prediction mode.

In step S405, the predictive image selection section 415 determines an optimal mode based on each cost function value output from the intra-prediction section 413 and the inter-prediction section 414. That is, the predictive image selection section 415 selects any one of the predictive image created by the intra-prediction section 413 and the predictive image created by the inter-prediction section 414.

In step S406, the computation section 403 computes a difference between the image rearranged through the processing of step S402 and the predictive image selected through the processing of step S405. The difference data has a reduced amount of data compared to that of the original image data. Therefore, it is possible to reduce the data amount compared to a case where an image is directly encoded.

In step S407, the orthogonal transform section 404 performs orthogonal transform for the difference information created through the processing of step S406. In step S408, the quantization section 405 quantizes the orthogonal transform coefficient obtained through the processing of step S407 using the quantization parameter computed by the rate control section 416.

In step S409, the dequantization section 408 dequantizes the quantized coefficient (referred to as a quantization coefficient) created through the processing of step S408 using a characteristic corresponding to the characteristic of the quantization section 405. In step S410, the inverse orthogonal transform section 409 performs inverse orthogonal transform for the orthogonal transform coefficient obtained through the processing of step S409.

In step S411, the computation section 410 adds the predictive image to locally decoded difference information to create a locally decoded image (image corresponding to the image input to the computation section 403).

In step S412, the loop filter 411 filters the image created through the processing of step S411. As a result, a block noise and the like are removed.

In step S413, the frame memory 412 stores the decoded image subjected to the loop filtering process in step S412.

In step S414, the lossless coding section 406 encodes the coefficient quantized through the processing of step S408. That is, lossless coding such as variable length coding or arithmetic coding is performed for the data corresponding to the difference image.

In this case, the lossless coding section 406 encodes information on the prediction mode of the predictive image selected through the processing of step S405 and adds the resultant encoded information to the coded data obtained encoding the difference image. In addition, the lossless coding section 406 also encodes information on the optimal intra-prediction mode supplied from the intra-prediction section 413 or information on the optimal inter-prediction mode supplied from the inter-prediction section 414 and adds the resultant encoded information to the coded data.

In step S415, the accumulation buffer 407 accumulates the coded data obtained through the processing of step S414. The coded data accumulated in the accumulation buffer 407 is appropriately read and transmitted to the decoding side through a transmission line or using a recording medium.

In step S416, the rate control section 416 controls the quantization rate of the quantization section 405 based on the code amount (amount of the created codes) of the coded data accumulated in the accumulation buffer 407 through the processing of step S415 in order to prevent an overflow or an underflow. In addition, the rate control section 416 supplies information on the quantization parameter to the quantization section 405.

As the processing of step S416 is terminated, the coding process is terminated.

By executing the coding process described above, the codec processing section 336 can encode the image data according to the HEVC scheme.

<Flow of Decoding Process>

Figure 27:
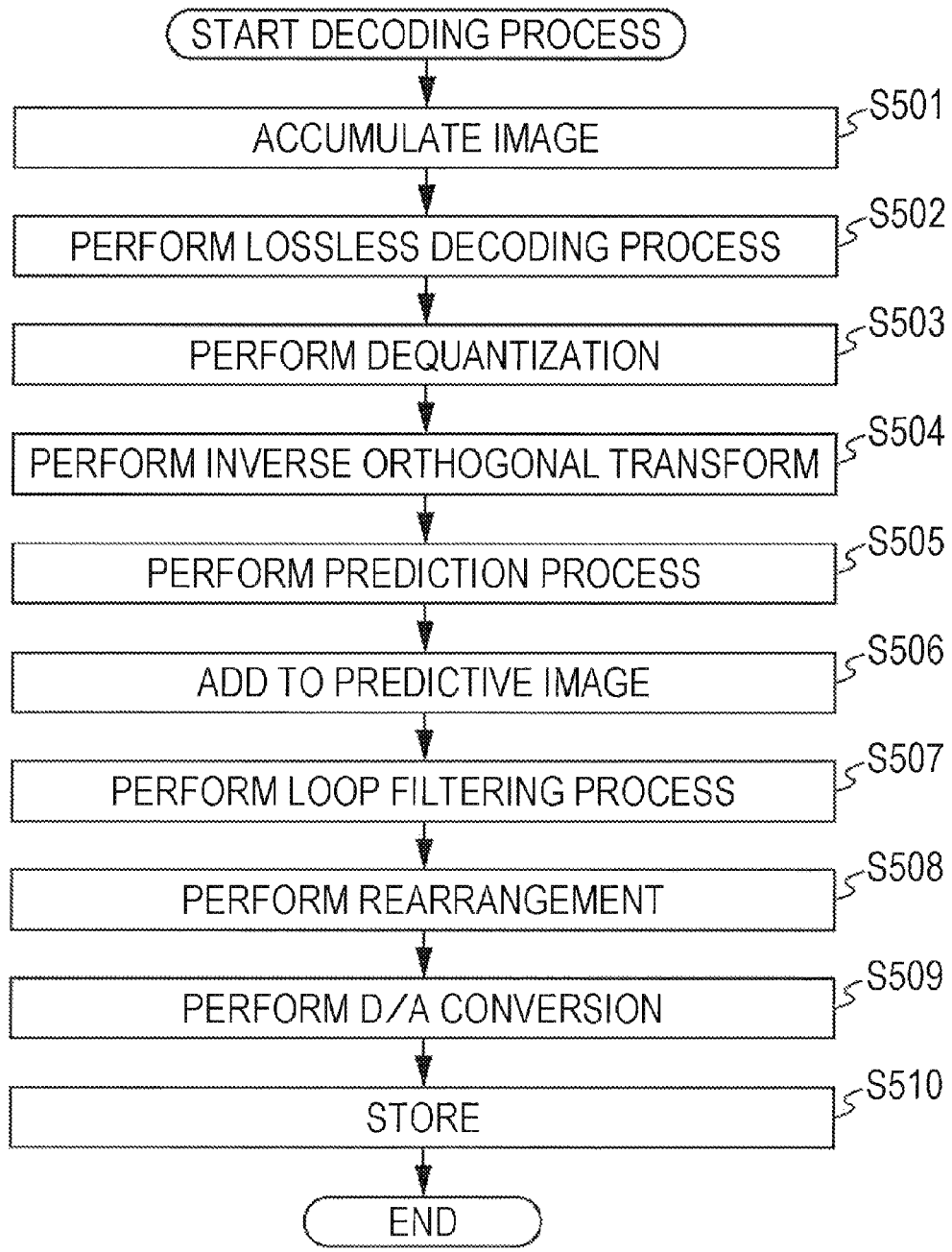
FIG. 27 is a flowchart illustrating an exemplary decoding process flow.

Next, an exemplary flow of the decoding process executed by the aforementioned decoding section 500 will be described with reference to the flowchart of FIG. 27.

As the decoding process starts, the accumulation buffer 501 accumulates the transmitted bit stream in step S501. In step S502, the lossless decoding section 502 decodes the bit stream (coded difference image information) supplied from the accumulation buffer 501. That is, an I-picture, a P-picture, and a B-picture encoded by the lossless coding section 406 of FIG. 23 are decoded. In this case, various types of information other than the difference image information included in the bit stream such as header information are also decoded.

In step S503, the dequantization section 503 dequantizes the quantized coefficient obtained through the processing of step S502.

In step S504, the inverse orthogonal transform section 504 performs inverse orthogonal transform for the coefficient dequantized in step S503.

In step S505, the intra-prediction section 510 or the inter-prediction section 511 performs a prediction process to create a predictive image. That is, the prediction process is performed in the prediction mode determined by the lossless decoding section 502 and applied to the coding. More specifically, for example, in a case where intra-prediction is applied to the coding, the intra-prediction section 510 creates the predictive image in the intra-prediction mode considered to be optimal at the time of the coding. For example, in a case where the inter-prediction is applied to the coding, the inter-prediction section 511 creates the predictive image in the inter-prediction mode considered to optimal at the time of the coding.

In step S506, the computation section 505 adds the predictive image created in step S505 to the difference image information obtained through the inverse orthogonal transform in step S504. As a result, the original image is recoded.

In step S507, the loop filter 506 appropriately performs a loop filtering process such as a deblock filtering process or an adaptive loop filtering process for the rearranged image obtained through the processing of step S506.

In step S508, the screen rearrangement buffer 507 rearranges the image subjected to the filtering process in step S507. That is, the frame sequence rearranged by the screen rearrangement buffer 402 of the coding section 400 for the coding is rearranged into the original display sequence.

In step S509, the D/A conversion section 508 performs digital-analog conversion for the image whose frame sequence is rearranged in step S508. The resultant image is output to a display section (not illustrated) and is displayed on the display section.

In step S510, the frame memory 509 stores the image subjected to the filtering process of step S507.

As the processing of step S510 is terminated, the decoding process is terminated.

By executing the coding process described above, the codec processing section 336 can decode the coded data obtained by encoding the image data according to the HEVC scheme.

The imaging device according to the present technology may have other configurations without limiting to the configuration described above. For example, the imaging device according to the present technology may be applied to an information processing device having a photographic imaging function, such as a digital camera, a video camera, a mobile phone, a smart phone, a tablet device, and a personal computer. Alternatively, the imaging device according to the present technology may also be applied to a camera module installed in other information processing devices (or mounted as an embedded device).

A series of the processes described above may be executed by hardware or software. If a series of the processes described above are executed by software, a program constituting the program is installed from a network or recording medium.

This recording medium may be configured, for example, as a recording section 337 as illustrated in FIG. 19. For example, the recording medium may include read-only memory (ROM) or a hard disk that is included in the recording section 337 and stores a program embedded in a device main body in advance and transmitted to a user. In addition, the recording medium may include a removable medium distributed to transmit a program to a user, where a program is stored, separately from the device main body. As described above, this removable medium serves as the recording section 337 when installed in a drive. The removable medium may include a magnetic disc (including a flexible disc), an optical disc (such as a CD-ROM or a DVD), an optomagnetic disc (such as a mini-disc (MD)), a solid-state device (SSD) memory, and the like.

For example, the program executed by a computer such as the controller 310 may be processed in a time-series manner according to the sequence described herein. Alternatively, the program may be processed in parallel or at a necessary timing such as call.

Herein, steps that describe a program recorded in a recording medium may include processes performed in a time-series manner according to a description sequence or processes executed individually or in parallel without necessity of limiting to the sequential processing.

Herein, a system refers to a set of elements (such as devices, modules, components) regardless of whether or not overall elements are housed in the same casing. Therefore, the system may refer to a plurality of devices stored in an individual casing and connected to each other via a network or a single device obtained by housing a plurality of modules in a single casing.

In the configuration described above, a single device (or processing section) may be divided into a plurality of devices (or processing sections). On the contrary, in the configuration described above, a plurality of devices (or processing sections) may be integrated into a single device (or processing section). An additional element may be added to the configuration of each device (or each processing section). As long as a configuration or operation of the entire system is substantially the same, a part of any device (or processing section) may be included in other devices (or processing sections).

Hereinbefore, while embodiments of this disclosure have been described in detail with reference to the accompanying drawings, a technical scope described herein is not limited to those embodiments. Those skilled in the art would appreciate that various changes or modifications may be possible without departing from the spirit and scope of the appended claims. Naturally, such changes or modifications are intended to encompass the technical scope of this disclosure.

For example, the present technology may have a cloud computing configuration in which a single functionality is processed in a distributed manner across a plurality of devices via a network.

Each step described in the aforementioned flowcharts may be executed by a single device or in a distributed manner across a plurality of devices.

In a case where a plurality of processing are included in a single step, the processings included in a single step may be executed by a single device or in a distributed manner across a plurality of devices.

The present technology may be embodied as the following configurations.

(1) An imaging apparatus including:
an image capturing unit configured to detect incident light and generate a raw image data;
a compression unit configured to compress the raw image data to generate a coded data having a data amount smaller than that of the raw image data; and
an output unit configured to output the coded data to a processing unit for processing the coded data,
wherein the image capturing unit, the compression unit, and the output unit are configured to be within a same semiconductor package.

(2) The imaging apparatus of (1), wherein the raw image data output from the image capturing unit is not transmitted over any bus prior to reception by the compression unit.

(3) The imaging apparatus of (1), wherein the output unit outputs the coded data to the processing unit through a bus.

(4) The imaging apparatus of (1), wherein the compression unit and the output unit are fabricated on a first semiconductor substrate, the processing unit is fabricated on a second semiconductor substrate, and a bus connects a circuitry of the output unit on the first semiconductor substrate to a circuitry of the processing unit on the second semiconductor substrate.

(5) The imaging apparatus of (4), wherein the image capturing unit is fabricated on a third semiconductor substrate that is overlapped with the first semiconductor substrate in a connected stack structure.

(6) The imaging apparatus of (4), wherein the image capturing unit is fabricated on the first semiconductor substrate.

(7) The imaging apparatus of (1), further including a pre-processing unit configured to receive the raw image data generated by the image capturing unit, and output a pre-processed raw image data to the compression unit.

(8) The imaging apparatus of (1), wherein the compression unit compresses the raw image data using a simplified compression method.

(9) The imaging apparatus of (8), wherein the simplified compression method is one of a differential pulse code modulation (DPCM) scheme and a discrete cosine transform (DCT) scheme.

(10) The imaging apparatus of (1), wherein the raw image data generated by the image capturing unit includes both still image data and moving picture image data that are concurrently collected.

(11) The imaging apparatus of (10), wherein a resolution of the moving picture image data portion of the raw image data is reduced prior to compression of the raw image data by the compression unit.

(12) The imaging apparatus of (10), wherein the compression unit compresses the still image data of the raw image data at a fixed compression rate, and compresses the moving picture image data of the raw image data at a variable compression rate.

(13) The imaging apparatus of (1), wherein the raw image data generated by the image capturing unit includes at least one of a still image data and a moving picture image data, wherein the compression unit compresses the still image data of the raw image data at a fixed compression rate, and compresses the moving picture image data of the raw image data at a variable compression rate.

(14) An image sensor includes:
an image capturing unit configured to detect incident light and generate a raw image data;
a compression unit configured to compress the raw image data to generate a coded data having a data amount smaller than that of the raw image data; and
an output unit configured to output the coded data to a bus for transmission to an image processing device.

(15) The image sensor of (14), wherein the generated raw image data is not transmitted over any bus prior to compression.

(16) An imaging method including:
detecting incident light and generating a raw image data based on the detected incident light;
compressing the raw image data to generate a coded data having a data amount smaller than that of the raw image data; and
outputting the coded data for further processing of the coded data,
wherein the generated raw image data is not transmitted over any bus prior to compression.

(17) A non-transitory computer-readable medium embodied with a program, which when executed by a computer, causes the computer to perform a method includes:
detecting incident light and generating a raw image data based on the detected incident light;
compressing the raw image data to generate a coded data having a data amount smaller than that of the raw image data; and
outputting the coded data for further processing of the coded data,
wherein the generated raw image data is not transmitted over any bus prior to compression.

(18) An image pickup element including:
a light-receiving section that receives incident light and photoelectrically converts the incident light; and
a compression section that compresses the image data obtained by the light-receiving section.

(19) The image pickup element according to any of (18) and (20) to (29), wherein the compression section performs simplified compression for the image data.

(20) The image pickup element according to any of (18), (19), and (21) to (29), wherein
a plurality of substrates are provided in a multilayer structure, and
the light-receiving section and the compression section are formed in different substrates.

(21) The image pickup element according to any of (18) to (20) and (22) to (29), wherein the light-receiving section and the compression section are formed in a single substrate.

(22) The image pickup element according to any of (18) to (21) and (23) to (29), wherein
the image data is a set of pixel data obtained by each unit pixel of the light-receiving section, and
the compression section performs Golomb coding for a difference value between the pixel data.

(23) The image pickup element according to any of (18) to (22) and (24) to (29), wherein the compression section performs 1-dimensional discrete cosine transform (DCT) for the image data.

(24) The image pickup element according to any of (18) to (23) and (25) to (29), wherein the compression section compresses the image data at a fixed compression rate.

(25) The image pickup element according to any of (18) to (24) and (26) to (29), further including a pre-processing section that performs predetermined signal processing for the image data obtained by the light-receiving section,
wherein the compression section compresses the image data subjected to the signal processing by the pre-processing section.

(26) The image pickup element according to any of (18) to (25) and (27) to (29), wherein the signal processing includes noise reduction or defect data correction.

(27) The image pickup element according to any of (18) to (26), (28), and (29), further including a reduction section that reduces a size of the image data into a predetermined size in a case where the image data is moving picture data,
wherein the compression section compresses the image data having an image size reduced by the reduction section in a case where the image data is data of a moving picture, or the compression section compresses the image data having an image size obtained by the light-receiving section in a case where the image data is data of a still image.

(28) The image pickup element according to any of (18) to (27) and (29), further including an output section that externally outputs coded data obtained by compressing the image data using the compression section.

(29) The image pickup element according to any of (18) to (28), further including a memory section that stores coded data obtained by compressing the image data using the compression section.

(30) An imaging device including:
an image pickup element having
a light-receiving section that receives and photoelectrically converts incident light, and a compression section that compresses image data obtained by the light-receiving section; and
a decompression section that decompresses coded data obtained by compressing the image data using the compression section and output from the image pickup element.
(31) The imaging device according to (30) and (32) to (36), wherein the compression section performs simplified compression for the image data.
(32) The imaging device according to (30), (31), and (33) to (36), wherein the image pickup element has a plurality of substrates having a multilayer structure, and
the light-receiving section and the compression section are formed in different substrates.
(33) The imaging device according to (30) to (32) and (34) to (36), wherein the light-receiving section and the compression section are formed in a single substrate.
(34) The imaging device according to (30) to (33), (35) and (36), wherein the image data is a set of pixel data obtained from each unit pixel of the light-receiving section, and
the compression section performs Golomb coding for a difference value between the pixel data.
(35) The imaging device according to (30) to (34) and (36), wherein the compression section performs 1-dimensional discrete cosine transform (DCT) for the image data.
(36) The imaging device according to (30) to (35), wherein the compression section compresses the image data at a fixed compression rate.
(37) An imaging method of an imaging device including:
receiving incident light and performing photoelectrical conversion using an image
pickup element of the imaging device;
compressing obtained image data;
outputting obtained coded data using the image pickup element; and
decompressing the coded data output from the image pickup element.

REFERENCE SIGNS LIST

100 Image pickup element
101, 102 Semiconductor substrate
111 Light-receiving section
112 A/D conversion section
113 Compression section
114 Output section
121 Bus
130 Image processing device
131 Input section
132 Decompression section
141 DPCM processing section
142 Golomb coding section
143 Compression rate adjustment section
144 1-dimensional DCT processing section
151 Compression rate inverse adjustment section
152 Golomb decoding section
153 Inverse DPCM processing section
154 1-dimensional inverse DCT processing section
160 Pre-processing section
161 Defect correction section
162 Defect position detector section
163 NR processing section
171 Controller
172 Image reduction section
181, 191 Semiconductor substrate
192 Memory controller
193 Memory section
201 Compression section
202 Decompression section
300 Imaging device
310 Controller
311 Manipulation section
320 Bus
331 Optical section
332 Image sensor
333 Input section
334 Decompression section
335 Image processing section
336 Codec processing section
337 Recording section
338 Communication section
339 Display section
341 Bus
400 Coding section
500 Decoding section

The invention claimed is:

1. An imaging apparatus comprising:
an image capturing unit configured to detect incident light and generate a raw image data;
a compression unit configured to compress the raw image data to generate a coded data having a data amount smaller than that of the raw image data; and
an output unit configured to output the coded data to a processing unit for processing the coded data,
wherein the image capturing unit, the compression unit, and the output unit are configured to be within a same semiconductor package,
wherein the compression unit and the output unit are fabricated on a first semiconductor substrate, the processing unit is fabricated on a second semiconductor substrate, and a bus connects a circuitry of the output unit on the first semiconductor substrate to a circuitry of the processing unit on the second semiconductor substrate, and
wherein the image capturing unit, the compression unit, the output unit, and the processing unit are each implemented via at least one processor.

2. The imaging apparatus of claim 1, wherein the raw image data output from the image capturing unit is not transmitted over any bus prior to reception by the compression unit.

3. The imaging apparatus of claim 1, wherein the output unit outputs the coded data to the processing unit through a bus.

4. The imaging apparatus of claim 1, wherein the image capturing unit is fabricated on a third semiconductor substrate that is overlapped with the first semiconductor substrate in a connected stack structure.

5. The imaging apparatus of claim 1, wherein the image capturing unit is fabricated on the first semiconductor substrate.

6. The imaging apparatus of claim 1, further comprising a pre-processing unit configured to receive the raw image data generated by the image capturing unit, and output a pre-processed raw image data to the compression unit,
Wherein the pre-processing unit is implemented via at least one processor.

7. The imaging apparatus of claim 1, wherein the raw image data generated by the image capturing unit comprises at least one of a still image data and a moving picture image data, wherein the compression unit compresses the still image data of the raw image data at a fixed compression rate, and compresses the moving picture image data of the raw image data at a variable compression rate.

8. The imaging apparatus of claim 1, wherein the compression unit compresses the raw image data using a simplified compression method.

9. The imaging apparatus of claim 8, wherein the simplified compression method is one of a differential pulse code modulation (DPCM) scheme and a discrete cosine transform (DCT) scheme.

10. The imaging apparatus of claim 1, wherein the raw image data generated by the image capturing unit comprises both still image data and moving picture image data that are concurrently collected.

11. The imaging apparatus of claim 10, wherein a resolution of the moving picture image data portion of the raw image data is reduced prior to compression of the raw image data by the compression unit.

12. The imaging apparatus of claim 10, wherein the compression unit compresses the still image data of the raw image data at a fixed compression rate, and compresses the moving picture image data of the raw image data at a variable compression rate.

13. An image sensor comprising:
an image capturing unit configured to detect incident light and generate a raw image data;
a compression unit configured to compress the raw image data to generate a coded data having a data amount smaller than that of the raw image data; and
an output unit configured to output the coded data to a bus for transmission to an image processing device,
wherein the compression unit and the output unit are fabricated on a first semiconductor substrate, the processing device is fabricated on a second semiconductor substrate, and a bus connects a circuitry of the output unit on the first semiconductor substrate to a circuitry of the processing device on the second semiconductor substrate, and
wherein the image capturing unit, the compression unit, the output unit, and the processing device are each implemented via at least one processor.

14. The image sensor of claim 13, wherein the generated raw image data is not transmitted over any bus prior to compression.

15. An imaging method comprising:
detecting incident light and generating a raw image data based on the detected incident light;
compressing the raw image data using circuitry fabricated on a first semiconductor substrate to generate a coded data having a data amount smaller than that of the raw image data; and
outputting, using circuitry fabricated on the first semiconductor substrate, the coded data to circuitry fabricated on a second semiconductor substrate for further processing of the coded data, wherein a bus connects the circuitry on the first semiconductor substrate used for outputting the coded data to the circuitry on the second semiconductor substrate used for further processing the coded data,
wherein the generated raw image data is not transmitted over any bus prior to compression.

16. A non-transitory computer-readable medium embodied with a program, which when executed by a computer, causes the computer to perform a method comprising:
detecting incident light and generating a raw image data based on the detected incident light;
compressing the raw image data using circuitry fabricated on a first semiconductor substrate to generate a coded data having a data amount smaller than that of the raw image data; and
outputting, using circuitry fabricated on the first semiconductor substrate, the coded data to circuitry fabricated on a second semiconductor substrate for further processing of the coded data, wherein a bus connects the circuitry on the first semiconductor substrate used for outputting the coded data to the circuitry on the second semiconductor substrate used for further processing the coded data,
wherein the generated raw image data is not transmitted over any bus prior to compression.

* * * * *